(12) United States Patent
Murakami et al.

(10) Patent No.: US 6,759,957 B2
(45) Date of Patent: Jul. 6, 2004

(54) HOME SECURITY SYSTEM

(75) Inventors: Takashi Murakami, Kyoto (JP);
Yasuyuki Shintani, Nishinomiya (JP);
Kazuhiro Aizu, Neyagawa (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 47 days.

(21) Appl. No.: 10/300,850

(22) Filed: Nov. 21, 2002

(65) Prior Publication Data

US 2003/0098789 A1 May 29, 2003

(30) Foreign Application Priority Data

Nov. 28, 2001 (JP) ......................................... 2001-363317

(51) Int. Cl.[7] ............................................. G08B 13/00
(52) U.S. Cl. ................... 340/541; 340/545.2; 340/548; 340/565; 348/143; 348/151; 348/152; 348/153; 348/154
(58) Field of Search ....................... 340/541, 545.2, 340/545.3, 548, 565; 348/143, 151, 152, 153, 154

(56) References Cited

U.S. PATENT DOCUMENTS

| | | | | |
|---|---|---|---|---|
| 4,567,557 A | * | 1/1986 | Burns | ........................... 700/16 |
| 5,459,450 A | * | 10/1995 | Beghelli | ...................... 340/538 |
| 5,657,076 A | * | 8/1997 | Tapp | ........................... 348/154 |
| 5,956,081 A | * | 9/1999 | Katz et al. | ................... 348/163 |
| 5,982,418 A | * | 11/1999 | Ely | .............................. 348/153 |

FOREIGN PATENT DOCUMENTS

| | | |
|---|---|---|
| DE | 42 29 257 | 3/1994 |
| EP | 0 971 540 | 1/2000 |
| GB | 2 264 802 | 9/1993 |
| GB | 2 329 541 | 3/1999 |
| JP | 10-271572 | 10/1998 |
| JP | 2000-091962 | 3/2000 |
| WO | 01/26280 | 4/2001 |

* cited by examiner

*Primary Examiner*—Toan N. Pham
(74) *Attorney, Agent, or Firm*—Wenderoth, Lind & Ponack, L.L.P.

(57) ABSTRACT

A home security system which includes sensors 11 to 18 that detect an alarming situation in different locations inside a facility, cameras 21 to 26 that capture images of different locations inside a facility, and a controller 30 that memorizes the associations between sensors 11 to 18 and cameras 21 to 26, and when any of the sensors 11 to 18 detects an alarming situation, has cameras that are associated with the sensors that have detected an alarming situation capture images based on the associations, and also updates the memorized associations.

42 Claims, 19 Drawing Sheets

Fig. 10

Linkage information 36d

User setting mode 1

|  | Camera 21 | Camera 22 | Camera 23 | Camera 24 | Camera 25 | Camera 26 |
|---|---|---|---|---|---|---|
| Sensor 11 | ○ |  |  |  |  |  |
| Sensor 12 |  | ○ |  |  |  |  |
| Sensor 13 |  | ○ |  |  |  |  |
| Sensor 14 |  |  | ○ |  |  |  |
| Sensor 15 |  |  |  | ○ |  |  |
| Sensor 16 |  |  |  |  | ○ |  |
| Sensor 17 |  |  |  |  | ○ |  |
| Sensor 18 |  |  |  |  |  | ○ |

Fig. 11

User setting mode 2 — Linkage information 36d

|  | Camera 21 | Camera 22 | Camera 23 | Camera 24 | Camera 25 | Camera 26 |
|---|---|---|---|---|---|---|
| Sensor 11 | ○ |  |  |  |  |  |
| Sensor 12 |  | ○ |  | ○ | ○ |  |
| Sensor 13 |  | ○ |  | ○ | ○ |  |
| Sensor 14 |  |  | ○ | ○ | ○ |  |
| Sensor 15 |  |  |  |  |  |  |
| Sensor 16 |  |  |  |  |  |  |
| Sensor 17 |  |  |  |  |  |  |
| Sensor 18 |  |  |  | ○ | ○ | ○ |

Fig. 12

Linkage information 36d

User setting mode 3

| | Camera 21 | Camera 22 | Camera 23 | Camera 24 | Camera 25 | Camera 26 |
|---|---|---|---|---|---|---|
| Sensor 11 | | | | | | |
| Sensor 12 | | ○ | | | | |
| Sensor 13 | | ○ | | | | |
| Sensor 14 | | | ○ | | | |
| Sensor 15 | | | | | | |
| Sensor 16 | | | | | | |
| Sensor 17 | | | | | | |
| Sensor 18 | | | | | | |

HOME SECURITY SYSTEM

BACKGROUND OF THE INVENTION (1) Field of the Invention

The present invention relates to a home security system that monitors the inside of a facility, and especially relates to a home security system that detects any occurrence of alarming situations and captures the images within a house or a facility by a camera.

(2) Description of the Related Art

So far, a home security system for monitoring the inside of a house has been proposed (see Japanese Laid-Open Patent Application No. H10-271572 as reference).

The conventional home security system mentioned above includes a plurality of sensors that detect any intruder breaking in, a plurality of cameras that are installed within a house, and a control unit that controls the cameras according to the result of detection by the sensors.

For example, when one of the aforementioned sensors detects an intruder breaking in, the control unit makes a camera that is fixedly associated with the sensor to capture the image, and sends the captured image data to an external home care service center via communication lines.

However, in the conventional home security system, each of the sensors and cameras are always associated with each other according to certain relationships, and the locations for capturing images cannot be varied nor the number be increased or decreased according to the level and condition of monitoring.

For instance, when the conventional home security system is installed in a house, and a sensor that detects an intruder breaking in from an entrance hall and a camera that captures the image of the entrance hall area are fixedly associated with each other, then when the sensor detects an intruder breaking in, the control unit chooses, among a plurality of cameras, the camera that is associated with the sensor to be the only camera to capture the image. As a result, even when the user, meaning the resident of the house, desires to have sufficient monitoring for going out, only one camera that is fixedly associated with a certain sensor captures images in the conventional home security system, and cannot make other cameras capture images. On the other hand, even when the user is at home and feeling a light monitoring is sufficient, in the conventional home security system, all the cameras that are fixedly associated with a certain sensor are going to capture images.

SUMMARY OF THE INVENTION

Now, in consideration of the foregoing problems, the object of the present invention is to provide a home security system that allows to vary as well as increase and decrease the locations of capturing images according to the level and condition of monitoring.

In order to achieve the above object, the present invention is the home security system that monitors an inside of a facility and comprises: a plurality of detection units operable to detect an alarming situation in different locations inside the facility; a plurality of image capturing units operable to capture an image in different locations inside the facility; an association memory unit operable to memorize associations between a plurality of the detection units and a plurality of the image capturing units; an updating unit operable to update the associations memorized in the association memory unit; and a control unit operable to, when one of a plurality of the detection units detects an alarming situation, have the image capturing unit which is associated with the detection unit that detects the alarming situation capture an image based on the associations memorized in the association memory unit.

Accordingly, since the updating unit updates said associations, it becomes possible to vary as well as increase and decrease the locations of capturing images according to the level and condition of monitoring.

Also, in the home security system, a plurality of the detection units, a plurality of the image capturing units and the control unit may communicate each other via an electric power line.

Therefore, when configuring the system in an already constructed house, a plurality of the detection units, a plurality of the image capturing units and the control unit can be connected using electric power lines that are already established in the house. As a result, not only that the system can be configured easily, but the detection units and the image capturing units can be added quite easily.

The home security system further comprises an image display unit, wherein the image capturing unit sends image data that indicates content of the captured image to the image display unit, and the image display unit displays the image captured by the image capturing unit based on the image data.

Accordingly, since the image captured by the capturing unit is displayed on the image display unit, the state of alarm situations can be confirmed easily by viewing the images.

Also, the home security system may further comprise a server that communicates with the image display unit and provides an image via a communication line, wherein the image display unit sends the image data obtained from the image capturing unit to the server, and the server provides the image based on the image data to a device that accesses the server via the communication line.

Accordingly, since the server provides the images captured by the image capturing unit via communication lines, the user is able to confirm the images captured by the image capturing units even from a place where he/she has gone by accessing the server using personal computers etc.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings:

FIG. 10 is an explanatory diagram for explaining relationships between sensors and cameras in "User setting mode 1" according to the present embodiment.

FIG. 11 is an explanatory diagram for explaining relationships between sensors and cameras in "User setting mode 2" according to the present embodiment.

FIG. 12 is an explanatory diagram for explaining relationships between sensors and cameras in "User setting mode 3" according to the present embodiment.

DESCRIPTION OF THE PREFERRED EMBODIMENT(S)

The following is an explanation of the home security system according to the embodiment of the present invention with reference to figures.

Figure 1:
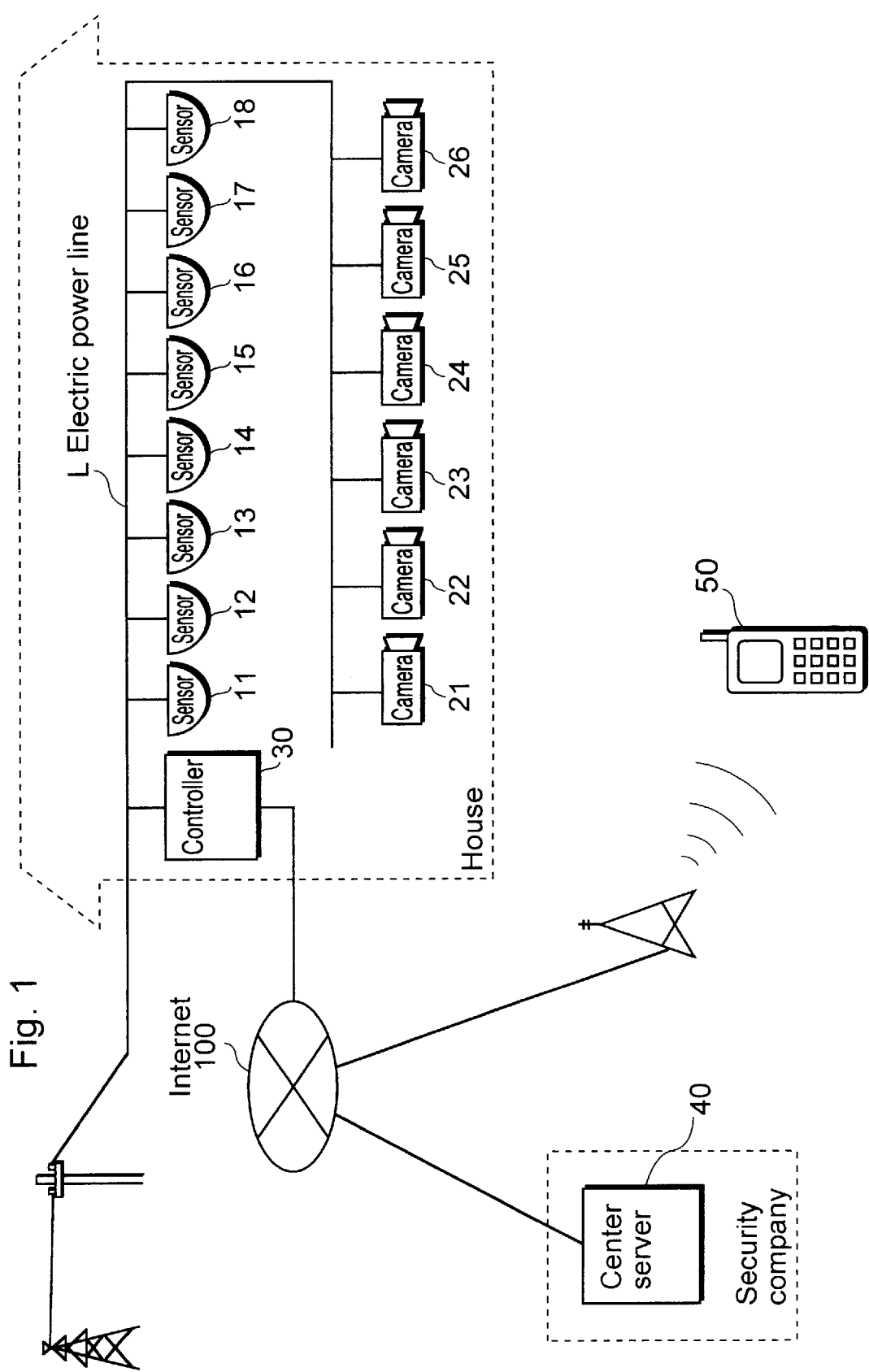
FIG. 1 is a diagram showing an overall structure of the home security system according to the embodiment of the present invention.

FIG. 1 is a constitutional diagram of the home security system according to the embodiment of the present invention.

The home security system is a system that varies as well as increases and decreases the locations of capturing images according to the level and condition of monitoring. The system includes eight sensors 11 to 18 that detect the existence of human being, six cameras 21 to 26 that capture still images, a controller 30 that controls the cameras 21 to 26 according to the detection results of the sensors 11 to 18, a center server 40 that communicates with the controller 30 via the Internet 100, and a cellular phone 50.

The sensors 11 to 18, the cameras 21 to 26 and the controller 30 are installed within a house that is a target for monitoring, and transmit signals via electric power lines L that are established within the house. In other words, signals outputted by the sensors 11 to 18, cameras 21 to 26, and the controller 30 are transmitted by superposing onto electric power flowing in the electric power lines L. In this way, the home security system according to the present embodiment allows an easy establishment of the system by using the electric power lines L, and also allows to minimize necessary wiring for establishing the system. The number of cameras and sensors can also be increased quite easily.

Now, the layout of the sensors 11 to 18 and the cameras 21 to 26 is explained with reference to FIG. 2.

Figure 2:
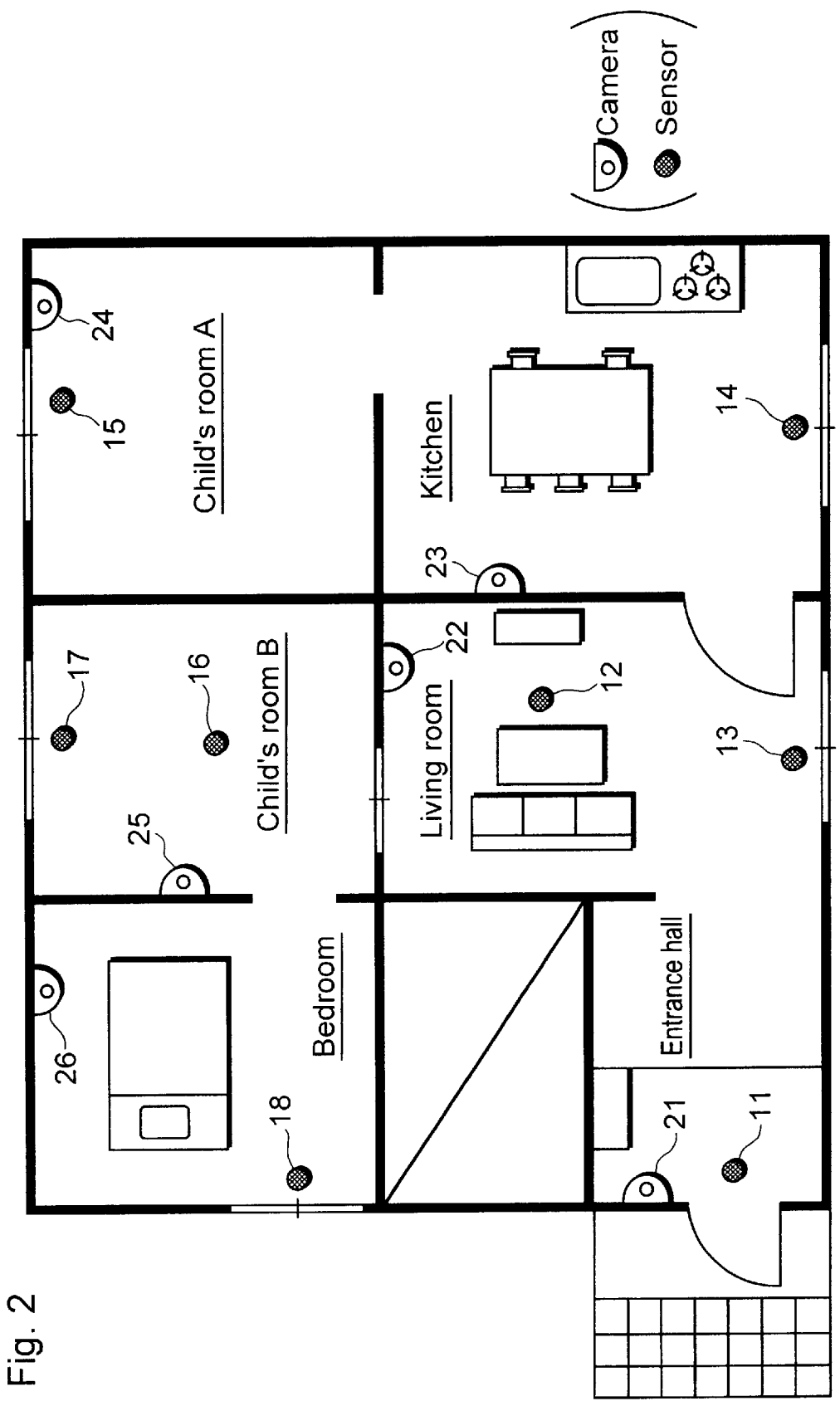
FIG. 2 is a layout drawing showing a layout of sensors and cameras according to the present embodiment.

FIG. 2 is a layout drawing showing an example of the layout of sensors 11 to 18 and cameras 21 to 26.

In the entrance hall, a sensor 11 and a camera 21 are installed. The sensor 11 detects the existence of human being in the entrance hall, while the camera 21 captures the image of the whole entrance hall area.

In the living room, sensors 12 and 13 as well as a camera 22 are installed. The sensor 12 detects the existence of human being in the center area of the room while the sensor 13 detects any existence of human being around the window of the living room, and the camera 22 captures the image of the whole room including the window area.

In the kitchen, a sensor 14 and a camera 23 are installed. The sensor 14 detects the existence of human being around the window of the kitchen, while the camera 23 captures the image of the whole kitchen area including the window.

In the child's room A, a sensor 15 and a camera 24 are installed. The sensor 15 detects any existence of human being around the window of the child's room A, while the camera 24 captures the image of the whole room including the window area.

In the child's room B, sensors 16 and 17 as well as a camera 25 are installed. The sensor 16 detects the existence of human being in the center area of the room while the sensor 17 detects any existence of human being around the window of the child's room B, and the camera 25 captures the image of the whole room including the window area.

And in the bedroom, a sensor 18 and a camera 26 are installed. The sensor 18 detects the existence of human being around the window of the room, while the camera 26 captures the image of the whole bedroom area including the window.

The sensors 11 to 18 comprise, for example, infrared sensors of pyroelectric-type that detect any existence of human being within a certain area by receiving infrared radiation emitted from human bodies, and send detection signals that notify whether there are any human being detected or not to the controller 30 via the electric power lines L.

Identification information for identifying each of the sensors 11 to 18 are also allocated, and when the sensors 11 to 18 send detection signals, they send as well the identification information that is allocated to each of them to the controller 30.

The center server 40 is located in a security company etc. that was commissioned to monitor the house by the resident of the house, meaning the user of the system, and places the images captured by any of the cameras 21 to 26 on a web page.

The cameras 21 to 26 have equal structure and function with each other, capture still images and send image data that indicates the content of the captured images to the controller 30 via the electric power lines L.

Figure 3:
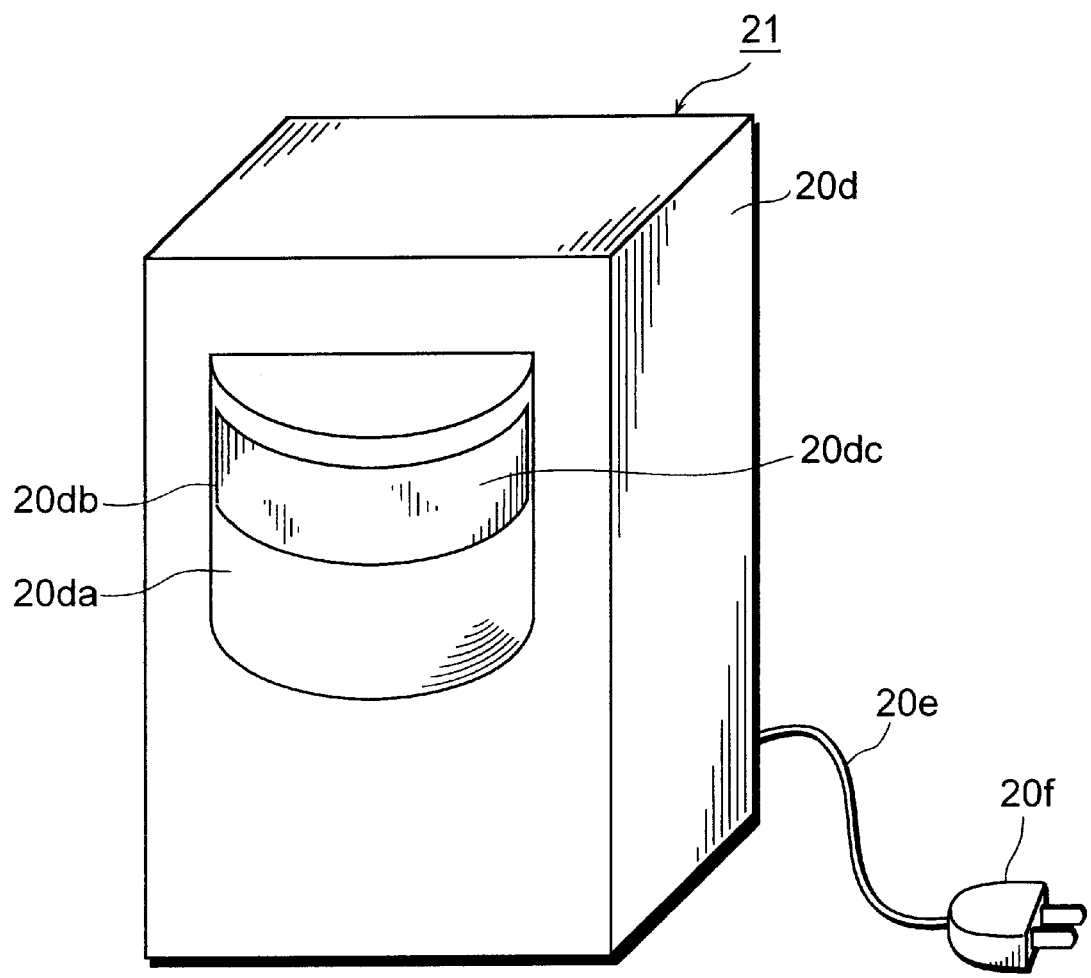
FIG. 3 is a perspective illustration of a camera according to the present embodiment.

FIG. 3 is a perspective illustration of the camera 21.

The camera 21 includes optical and electronic equipment for performing the above-mentioned functions, a case 20d which is a nearly rectangular box made of molded resin that contains said equipment, a power cable 20e that is lead out from inside of the case 20d, and a plug 20f that is fit at the end of the power cable 20e opposite from the case 20d.

At the front side of the case 20d, a protruding part 20da is formed to protrude frontward, and the protruding part 20da has an opening part 20db that connects the inside and outside of the case 20d. The protruding part 20da also has a translucent film 20dc that transmits light and is fit to block the opening part 20db.

Inside of the protruding part 20da, mirrors and lenses etc. of the optical equipment are installed. The light coming in from outside is lead into the interior of the case 20d through the translucent film 20dc, condensed by the lenses and the mirrors, and finally be received by CCD (Charge Coupled Device) which is an image pickup device that constitutes a part of the electronic equipment. Accordingly, the camera 21 captures the image of the scene viewed within approximately 180 degree angle in horizontal direction, from inside of the protruding part 20da through the translucent film 20dc.

The camera 21 is installed so that the backside of the case 20d faces the wall, and is used by plugging in the plug 20f to a power receptacle located inside of the house.

Figure 4:
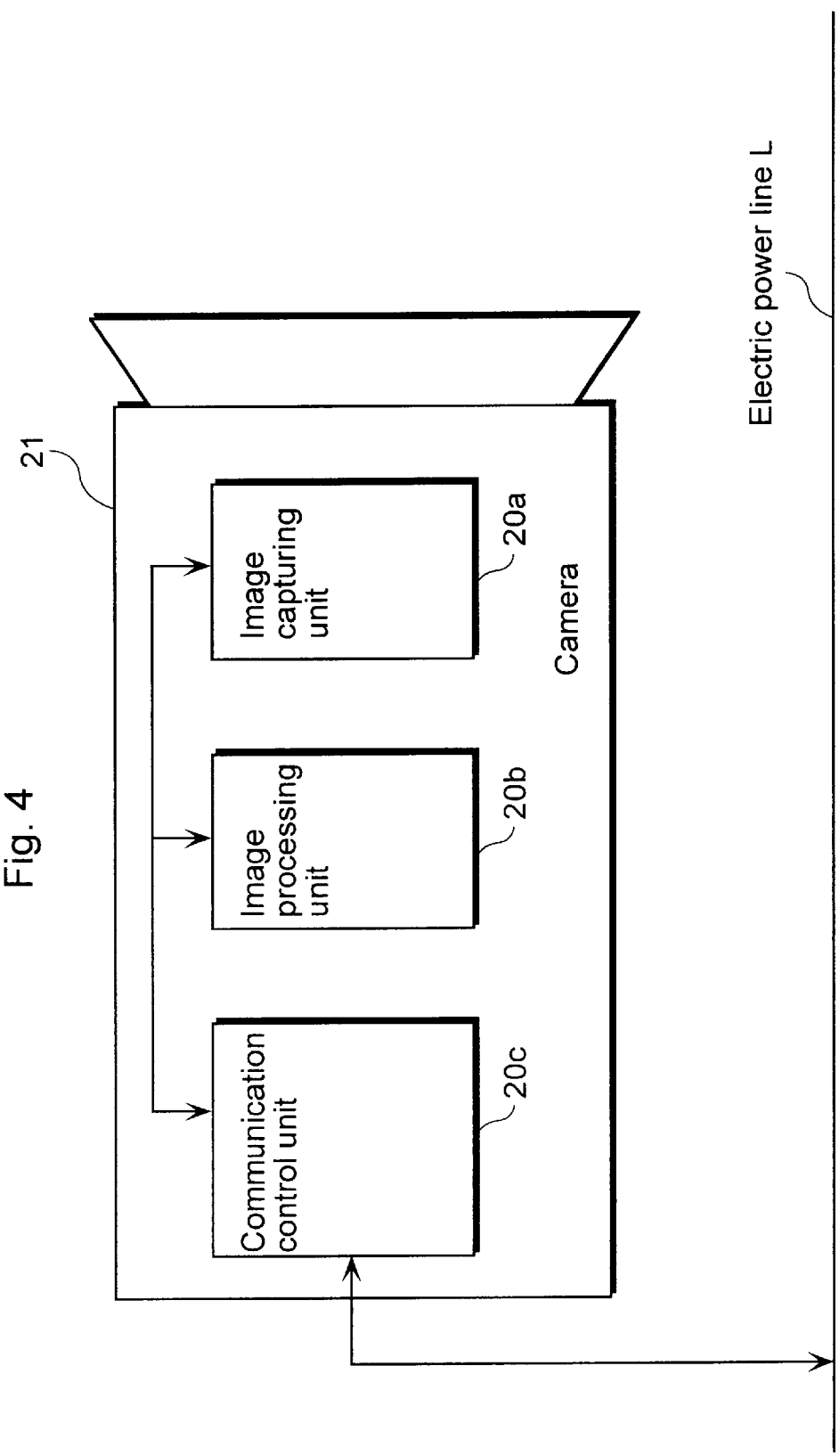
FIG. 4 is a block diagram showing an internal structure of a camera according to the present embodiment.

FIG. 4 is a block diagram of the optical and electronic equipment of the camera 21.

As shown in FIG. 4, the camera 21 is equipped with the lenses and the CCD, and includes an image capturing unit 20a that generates the image data, an image processing unit 20b that performs image processing such as compressing the image data, and a communication control unit 20c that communicates with the controller 30 and controls the image capturing unit 20a and the image processing unit 20b according to the communication result. The cameras 22 to 26 have the same structure as the camera 21, which means each of them has an image capturing unit 20a, an image processing unit 20b and a communication control unit 20c.

When the communication control unit 20c receives an image capturing direction signal that directs to capture an image from the controller 30, it makes the image capturing unit 20a to capture an image and generate image data, and makes the image processing unit 20b to compress the image data after changing the image data to a prescribed size. For example, the communication control unit 20c makes the image capturing unit 20a to capture an image and to generate image data of 320×240 pixels, and then makes the image processing unit 20b to change the image data to image data of 240×80 pixels and to compress the image data by JPEG (Joint Photographic Experts Group) format. The data size of the compressed image data differs according to the object of shooting.

Next, the communication control unit 20c sends a size notification signal that notifies the data size of the compressed image data to the controller 30. And when the communication control unit 20c receives a transmission direction signal, from the controller 30, that directs to send the image data in said data size, the communication control unit 20c sends the image data to the controller 30. Meanwhile, when the communication control unit 20c receives a compression transmission direction signal, from the controller 30, that directs to compress the data size with a prescribed compression ratio before sending, the communication control unit 20c makes the image processing unit 20b compress the image data with the directed compression ratio, and sends the compressed image data to the controller 30.

Since the camera 21 compresses the image data before sending, it can prevent the image quality to be lowered while shortening the time needed for transmission as well.

Furthermore, the communication control unit 20c does not send the image data as it is, but divides the image data when sending to the controller 30.

Figure 5:
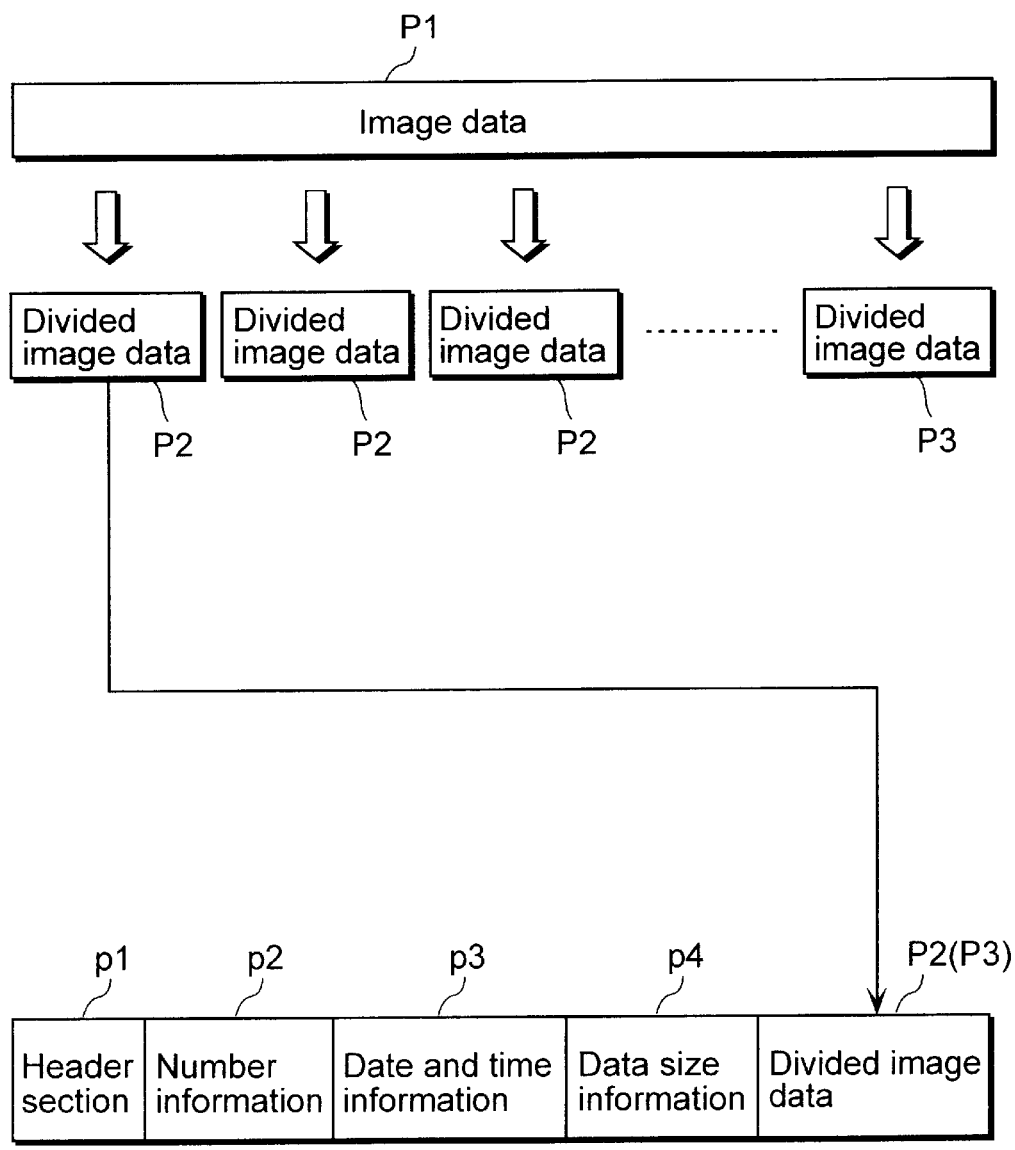
FIG. 5 is a data structure diagram that illustrates image data being transmitted according to the present embodiment.

FIG. 5 is a data structure diagram that illustrates image data being divided and transmitted.

As shown in FIG. 5, when the data size of image data P1 exceeds 131 bytes, the communication control unit 20c instructs the image processing unit 20b to divide the image data P1 into one or more than one divided image data P2 that has the data size of 131 bytes each, and a divided image data P3 that has the data size of less than 131 bytes.

Then the communication control unit 20c creates packets by adding, to each of the divided image data P2 and P3, a header section p1, number information p2 that indicates the number allocated to the divided image data P2 and P3, date and time information p3 that indicates the date and time that the image is captured, and data size information p4 that indicates the data size of the image data P1 before dividing, and then sends the plurality of packets that include the divided image data P2 or the divided image data P3 to the controller 30.

In this way, the controller 30 that has obtained the plurality of packets is able to judge whether all the packets are obtained or not from the number indicated by the number information p2, the data size indicated by the data size information p4 and the date and time indicated by the date and time information p3, all of which being included in each of the packets, and thus an accurate transmission of the image data P1 becomes possible.

When the controller 30 receives a detection signal that notifies an existence of human being together with identification information from any of the sensors 11 to 18, it directs a camera that is associated with the sensor to which the identification number is allocated to capture an image.

Figure 6:
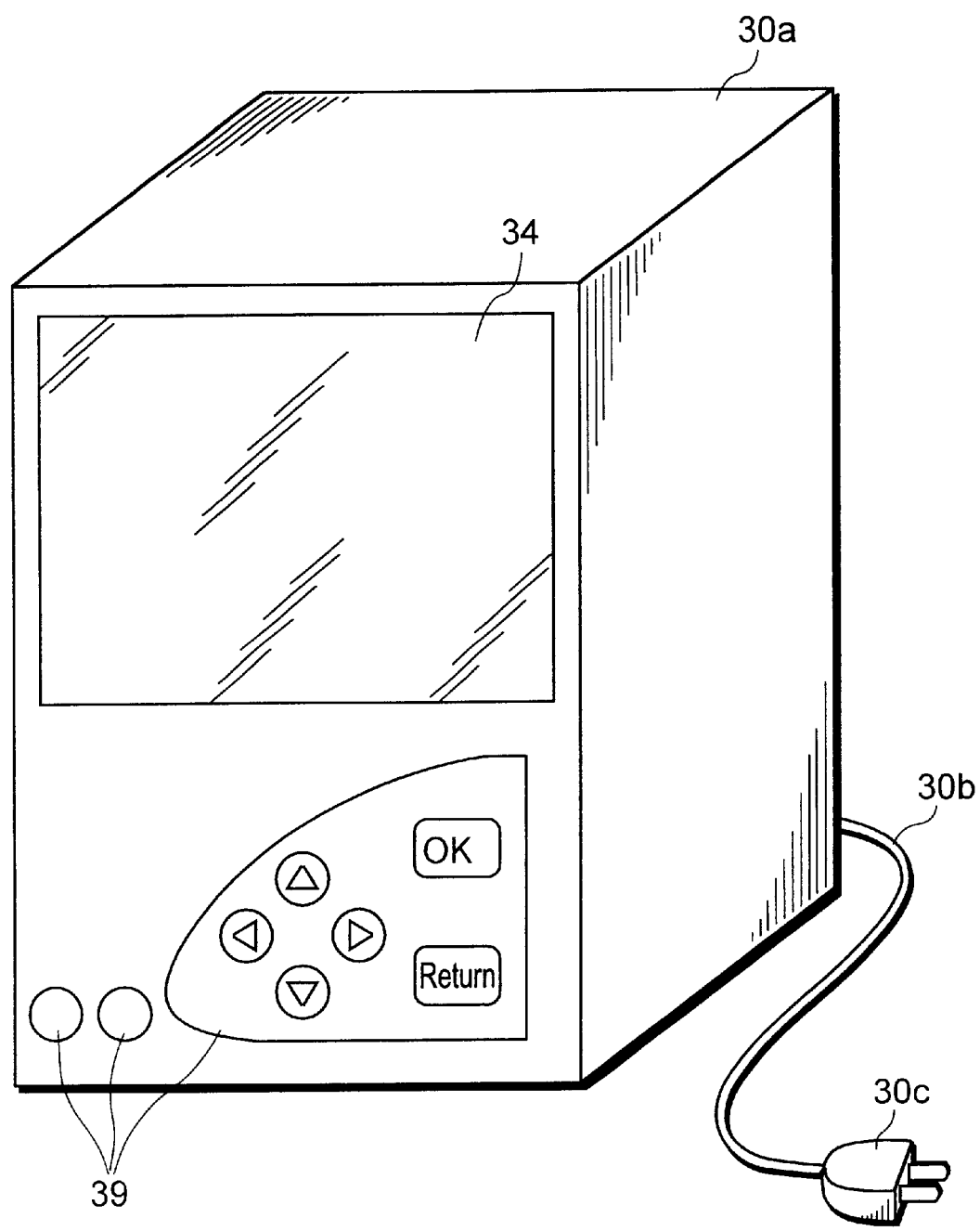
FIG. 6 is a perspective illustration of a controller according to the present embodiment.

FIG. 6 is a perspective illustration of the controller 30.

The controller 30 includes electronic equipment for performing the above-mentioned functions, a controller case 30a which is a nearly rectangular box made of molded resin that contains said equipment, a power cable 30b that is lead out from inside of the controller case 30a, and a plug 30c that is fit at the end of the power cable 30b opposite from the controller case 30a. The controller 30 is installed so that the backside of the controller case 30a faces the wall, and is used by plugging in the plug 30c to a power receptacle located inside of the house.

Figure 7:
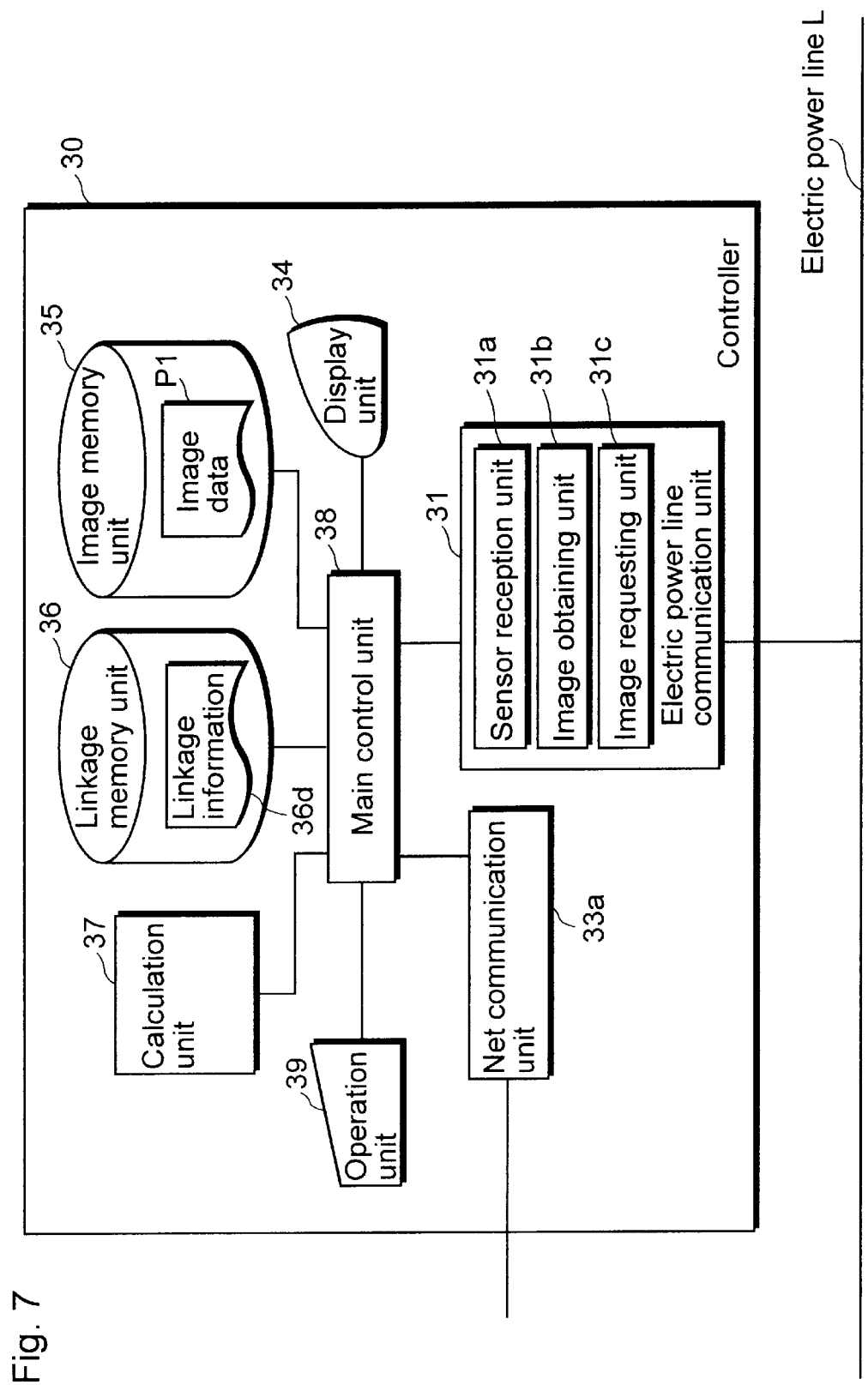
FIG. 7 is a block diagram showing an internal structure of a controller according to the present embodiment.

FIG. 7 is a block diagram of the electronic equipment included in the controller 30.

As shown in FIG. 7, the controller 30 includes an electric power line communication unit 31 that communicates with sensors 11 to 18 and cameras 21 to 26 via electric power lines L, a net communication unit 33a that communicates with a center server 40 via the Internet 100, a display unit 34 that displays characters and images according to input signals, an image memory unit 35 that memorizes image data P1, a linkage memory unit 36 which memorizes linkage information 36d that indicates the association between the sensors 11 to 18 and the cameras 21 to 26, a calculation unit 37 that calculates the compression ratio for directing any of the cameras 21 to 26 to compress image data P1, a main control unit 38 that controls the electric power line communication unit 31, the net communication unit 33a, the display unit 34, the image memory unit 35, the linkage memory unit 36 and the calculation unit 37, as well as an operation unit 39 that is equipped with a plurality of operation buttons operated by the user and outputs operation signals that indicate directions according to the operation to the main control unit 38.

In addition, the electric power line communication unit 31 includes an image requesting unit 31c that directs any of the cameras 21 to 26 to capture images and requests image data P1, an image obtaining unit 31b which obtains packets that include the image data P1 or divided image data P2 and P3 from any of the cameras 21 to 26, and a sensor reception unit 31a that receives detection signals and identification information from any of the sensors 11 to 18.

Also as shown in FIG. 6, several openings that connect the inside and outside of the case are formed at the front side of the controller case 30a. The display unit 34 is located inside of the controller case 30a so that the side that displays characters and images is exposed from one of the openings, while the operation unit 39 is located inside of the controller case 30a so that the operation buttons are exposed from other openings.

Now, the overall operation according to the present embodiment is explained with reference to FIG. 8.

Figure 8:
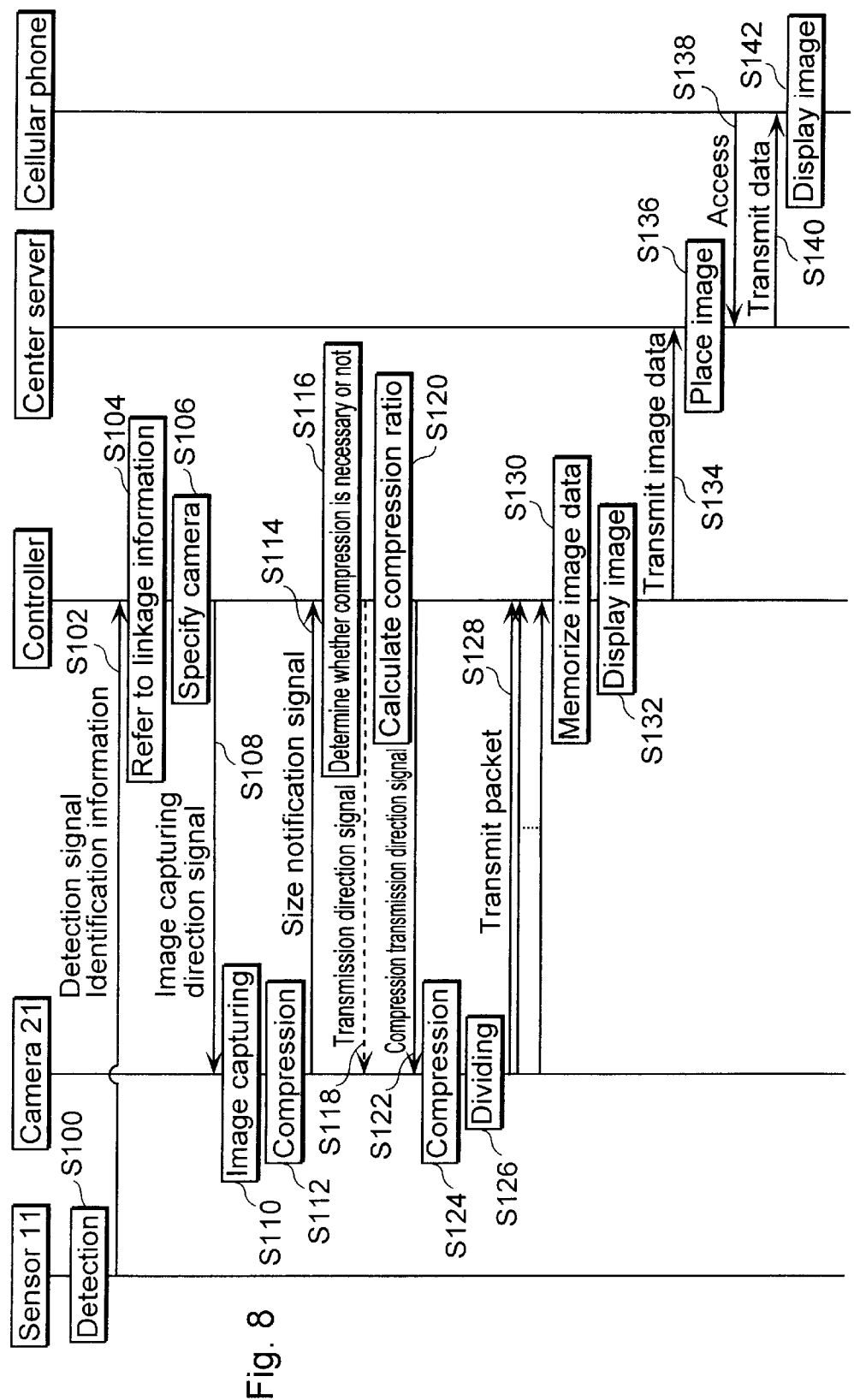
FIG. 8 is a sequence diagram showing an overall operation of the home security system according to the present embodiment.

FIG. 8 is a sequence diagram showing an example of an overall operation according to the present embodiment.

First, for example, when the sensor 11 that is installed in the entrance hall detects human being (Step S100), the sensor 11 sends a detection signal that notifies an existence of human being as well as its own identification information to the controller 30 (Step S102).

When the detection signal and the identification information are received by the sensor reception unit 31a of the electric power line communication unit 31, the main control unit 38 of the controller 30 comprehends, based on the received result, that the sensor 11 has detected human being and refers to linkage information 36d that is memorized in the linkage memory unit 36 (Step S104). Here in this linkage information 36d, the sensor 11 is associated with the camera 21.

After referring to the linkage information 36d, the main control unit 38 of the controller 30 determines that a camera associated with the sensor 11 is the camera 21 (Step S106). Then, the main control unit 38 makes the image requesting unit 31c of the electric power line communication unit 31 to send an image capturing direction signal that directs the camera 21 to capture an image (Step S108).

When the communication control unit 20c of the camera 21 receives the image capturing direction signal, it makes the image capturing unit 20a to capture an image (Step S110), and makes the image processing unit 20b to change size and compress image data P1 generated by the image capturing unit 20a (Step S112). Then, the communication control unit 20c sends a size notification signal that notifies the controller 30 of the data size of the compressed image data P1 (Step S114).

When the main control unit 38 of the controller 30 obtains the size notification signal via the electric power line communication unit 31, the main control unit 38 judges whether the image data P1 generated by the camera 21 needs to be compressed further, based on the data size indicated by the size notification signal (Step S116).

If the main control unit 38 of the controller 30 judges that compression is not necessary because the data size is less than or equal to a prescribed size, it makes the image requesting unit 31c of the electric power line communication unit 31 to send, to the camera 21, a transmission direction signal that directs to send the image data P1 without compressing (Step S118).

Meanwhile, if the main control unit 38 of the controller 30 judges that compression is necessary because the data size is larger than a prescribed size, it makes the calculation unit 37 to calculate the compression ratio so that the data size becomes less than or equal to the prescribed size (Step S120). The main control unit 38 then makes the image requesting unit 31c of the electric power line communication unit 31 to send, to the camera 21, a compression transmission direction signal that directs to compress the image data by the calculated compression ratio and send the compressed image data P1 (Step S122).

Next, when the communication control unit 20c of the camera 21 receives the compression transmission direction signal, it instructs the image processing unit 20b to compress the image data P1 by the compression ratio directed by the signal (Step S124), and if necessary, makes the image processing unit 20b to divide the compressed image data P1 into a plurality of divided image data P2 and P3 (Step S126). Then, the communication control unit 20c sends the divided image data P2 and P3 that are made into packets to the controller 30 (Step S128).

When the main control unit 38 of the controller 30 obtains the plurality of packets via the image obtaining unit 31b of the electric power line communication unit 31, it combines the divided image data P2 and P3 that are included in each of the packets, reproduces the image data P1 before dividing, and memorizes the image data P1 in the image memory unit 35 (Step S130).

Here, if the main control unit 38 determines that all the packets are not obtained by the image obtaining unit 31b, by checking the number indicated by number information p2 and the data size indicated by the data size information p4 that are included in each of the packets, the main control unit 38 identifies the missing packet. And the main control unit 38 makes the image requesting unit 31c of the electric power line communication unit 31 to specify, to the camera 21, the number of the number information p2 included in the missing packet and request to send the packet. Since the communication control unit 20c of the camera 21 sends the packet according to the request, the image data P1 can be sent accurately.

Now, the main control unit 38 of the controller 30 sends the reproduced image data P1 to the display unit 34 and makes the image display unit 34 to display the image captured by the camera 21 (Step S132). The main control unit 38 also makes the net communication unit 33a to send the image data P1 to the center server 40 via the Internet 100 (Step S134).

When the center server 40 obtains the image data P1, it places an image based on the image data P1 onto a certain web page (Step S136).

Now when the resident of a house where the home security system according to the present embodiment is installed accesses the web page of the center server 40 using a cellular phone 50 from a place where he/she has gone (Step S138), the center server 40 sends data for displaying the web page to the cellular phone 50 (Step S140). As a result, the cellular phone 50 displays the web page that includes the image captured by the camera 21 onto a display unit, which includes LCD (Liquid crystal display), that is equipped to the phone (Step S142).

Accordingly, in the present embodiment, cameras 21 to 26 capture images of certain locations within a house when any intruder breaks into the house, and the captured images are sent to the center server 40. As a result, the security company that owns the center server 40 can easily figure out the condition of the house, while by placing the image onto a web page, the resident of the house is able to figure out the condition of the house by using the cellular phone 50 from somewhere outside and viewing the image through the Internet 100.

Here in the home security system according to the present embodiment, the setting of the relationships between sensors 11 to 18 and cameras 21 to 26 are made to be variable.

In the linkage information 36d that is memorized in the linkage memory unit 36, there is a plurality of modes categorized according to the level and condition of monitoring, and the linkages between the sensors 11 to 18 and the cameras 21 to 26 are registered according to each mode. Based on an operation signal outputted from the operating unit 39 as a result of an operation made by the user to the operation unit 39, the main control unit 38 selects one of the plurality of modes in the linkage information 36d and directs a camera that is associated with the selected mode to capture an image.

Figure 9:
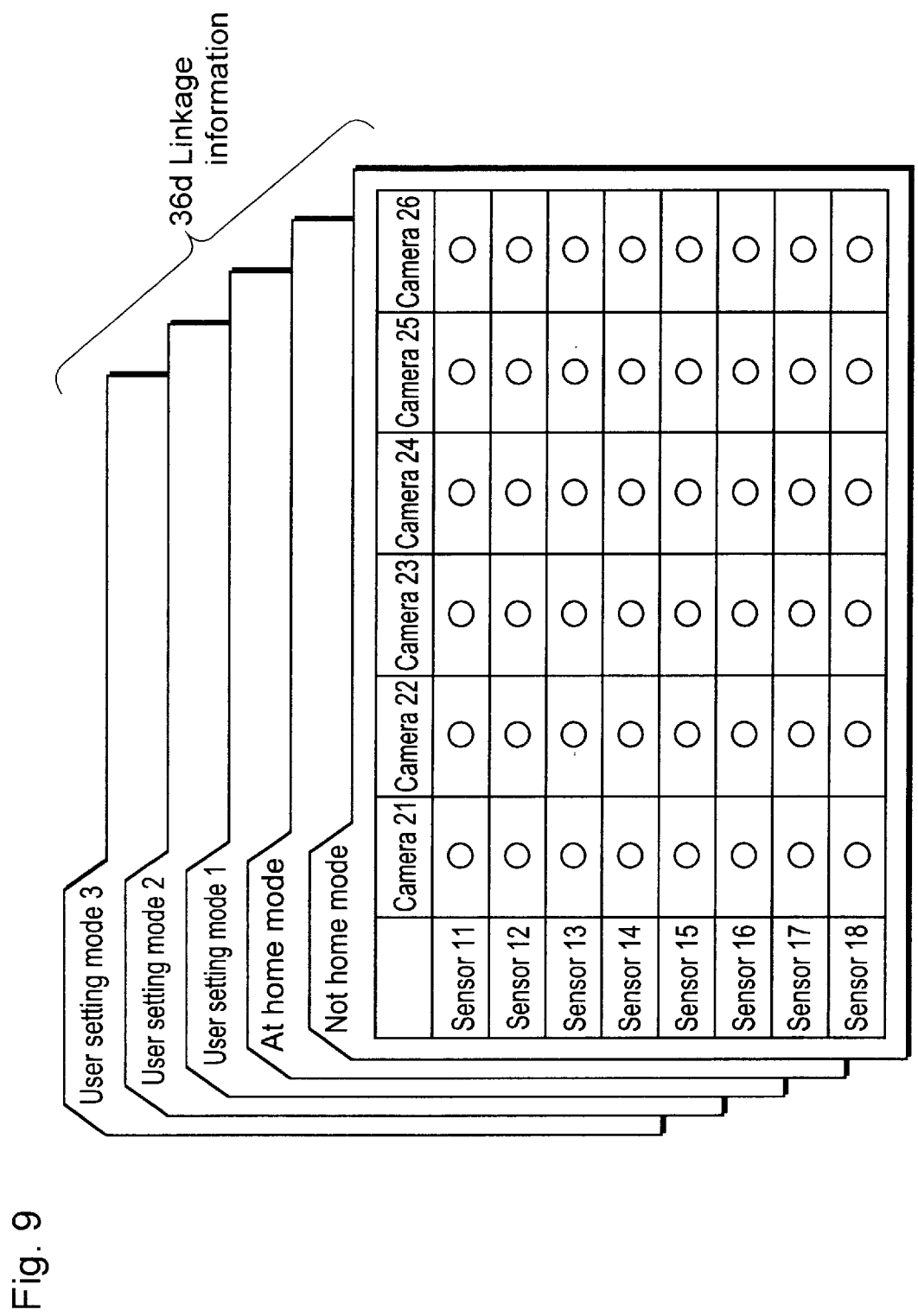
FIG. 9 is an explanatory diagram for explaining the content included in linkage information according to the present embodiment.

FIG. 9 is an explanatory diagram for explaining the content included in linkage information 36d.

Linkage information 36d may have, for example, five different modes that are "Not home mode", "At home mode", "User setting mode 1", "User setting mode 2", and "User setting mode 3".

"Not home mode" is a mode suitable when sufficient monitoring is necessary such as the case when all the residents of the house are going out, and in this "Not home mode", each of the sensors 11 to 18 are associated with all of the cameras 21 to 26 as shown by the circles in FIG. 9. So when the user selects the "Not home mode" according to the necessary level of monitoring by operating the operation buttons of the operation unit 39 of the controller 30, the main control unit 38 selects the "Not home mode" out of five different modes, and when any of the sensors 11 to 18 detects human being, the main control unit 38 directs all of the cameras 21 to 26 to capture images.

"At home mode" is a mode suitable when monitoring is not necessary such as the case when the resident of the house is at home, and in this "At home mode", the sensors 11 to 18 are not associated with any of the cameras. Accordingly, when the user selects the "At home mode" according to the necessary level of monitoring by operating the operation buttons of the operation unit 39 of the controller 30, the main control unit 38 selects the "At home mode" out of five different modes, and does not direct the cameras 21 to 26 to capture images even when any of the sensors 11 to 18 detects human being.

"User setting mode 1", "User setting mode 2" and "User setting mode 3" are the modes to which the relationships are set by the user.

FIG. 10 is an explanatory diagram for explaining relationships between sensors 11 to 18 and cameras 21 to 26 in the "User setting mode 1".

The "User setting mode 1" is a mode in which the sensors 11 to 18 and the cameras 21 to 26 are linked so that when the sensor installed in each room detects human being, the camera installed in the same room is made to capture an image. To be specific, in the "User setting mode 1", the sensor 11 is linked with the camera 21, the sensors 12 and 13 with the camera 22, the sensor 14 with the camera 23, the sensor 15 with the camera 24, the sensors 16 and 17 with the camera 25 and the sensor 18 is linked with the camera 26.

Accordingly, when the user selects the "User setting mode 1" according to the necessary level and condition of monitoring by operating the operation buttons of the operation unit 39 in the controller 30, the main control unit 38 of the controller 30 selects the "User setting mode 1" out of five different modes, and for example, makes the camera 21 to capture the image of the entrance hall if the sensor 11 that is located in the entrance hall detects human being, and makes the camera 25 to capture the image of the child's room B if the sensor 16 that is located in the child's room B detects human being.

FIG. 11 is an explanatory diagram for explaining relationships between sensors 11 to 18 and cameras 21 to 26 in the "User setting mode 2".

The "User setting mode 2" is a mode in which the sensors 11 to 18 and the cameras 21 to 26 are linked so that when any of the sensors installed in each room other than the child's room A and the child's room B detects human being, the cameras installed in the same room as the sensor as well as those installed in the child's room A and the child's room B are made to capture images, and when the sensors installed in the child's room A and the child's room B detect human being, none of the cameras is made to capture image. To be specific, in the "User setting mode 2", the sensor 11 is linked with the cameras 21, 24 and 25, the sensors 12 and 13 with the cameras 22, 24 and 25, the sensor 14 with the cameras 23 to 25, the sensor 18 with the cameras 24 to 26, and the sensors 15, 16 and 17 are not linked with any of the cameras.

Accordingly, when the user is going out with their children left in the child's room A and the child's room B, the user selects the "User setting mode 2" according to the level and condition of monitoring necessary in such a case. Then, the main control unit 38 of the controller 30 selects the "User setting mode 2" out of five different modes, and directs the cameras 21, 24 and 25 to capture the images of the entrance hall as well as the child's room A and the child's room B if the sensor 11 detects human being in the entrance hall, and makes the cameras 22, 24 and 25 to capture the images of the living room as well as the child's room A and the Child's room B if the sensor 12 detects human being in the living room.

FIG. 12 is an explanatory diagram for explaining relationships between sensors 11 to 18 and cameras 21 to 26 in the "User setting mode 3".

The "User setting mode 3" is a mode in which the sensors 11 to 18 and the cameras 21 to 26 are linked so that when the sensors installed in the entrance hall, the living room or the kitchen detect human being, the cameras installed in the respective rooms are made to capture images. To be specific, in the "User setting mode 3", the sensor 11 is linked with the camera 21, the sensors 12 and 13 with the camera 22, the sensor 14 with the camera 23, and the sensors 15, 16, 17 and 18 are not linked with any of the cameras.

Accordingly, when the user is going to bed after having the children sleeping in the child's room A and the child's room B, the user selects the "User setting mode 3" according to the level and condition of monitoring necessary in such a case. Then, the main control unit 38 of the controller 30 selects the "User setting mode 3" out of five different modes, and directs the camera 21 to capture the image of the entrance hall if the sensor 11 detects human being in the entrance hall, and makes the camera 22 to capture the image of the living room if the sensor 12 detects human being in the living room.

Now, a method of changing mode setting categorized according to the level and condition of monitoring as explained above, and a method of confirming the currently selected mode are explained.

For instance, when the user operates the operation unit 39 of the controller 30 in order to change or confirm the mode setting, the main control unit 38 of the controller 30 makes display unit 34 to display a screen that inquires whether the user desires to change or confirm the mode setting, or to change or confirm the setting of relationships between sensors and cameras (hereinafter referred to as "linkage setting") in each mode.

Figure 13:
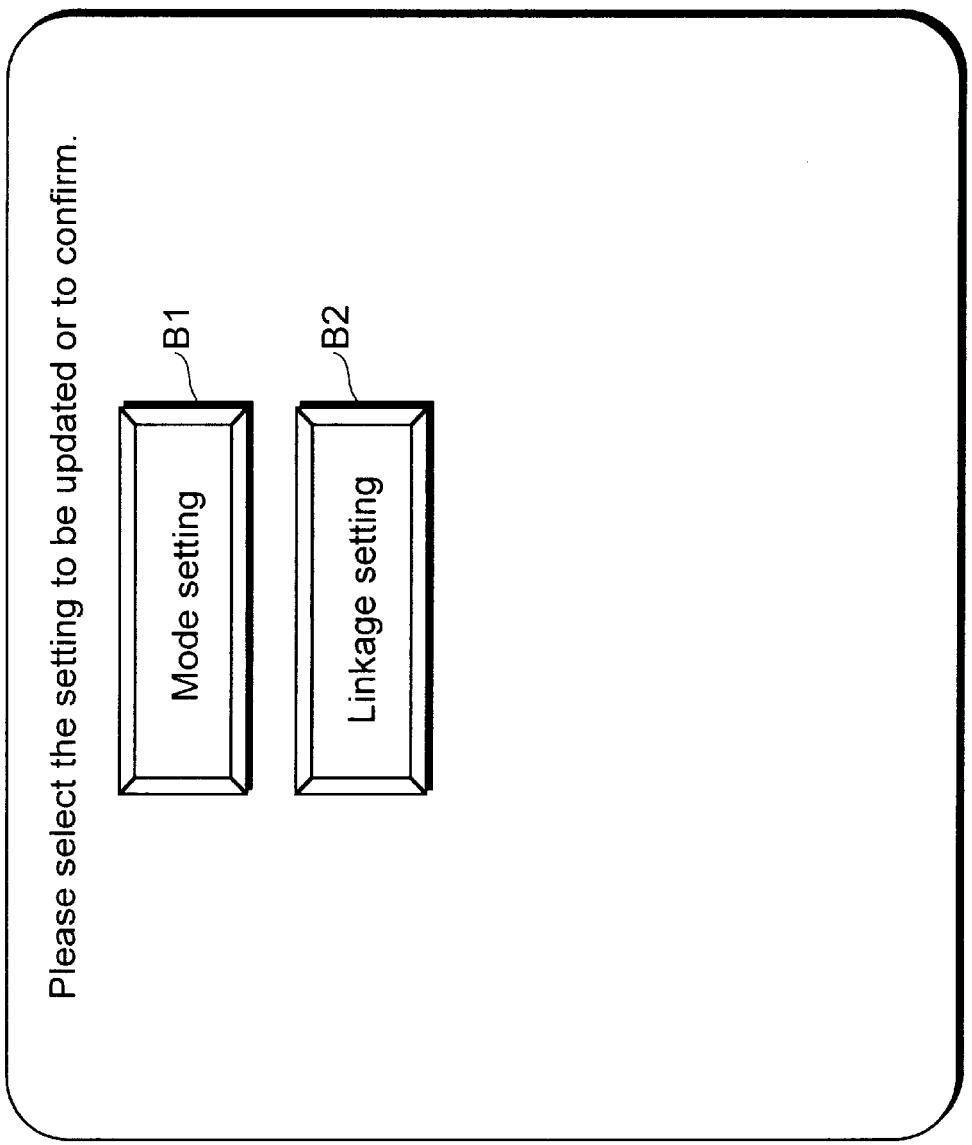
FIG. 13 is a screen display diagram of a controller according to the present embodiment.

FIG. 13 is a screen display diagram that shows an example of said screen.

As shown in FIG. 13, on the display unit 34, a button B1 which reads "Mode setting" that is for updating or confirming mode setting, and a button B2 which reads "Linkage setting" that is for updating or confirming linkage setting are displayed.

If the user desires to change or confirm mode setting, he/she operates the operation buttons of the operation unit 39 that are marked with arrows so that the button B1 is highlighted, and then operates the operation button of the operation unit 39 that is marked as "OK" to select the button B1.

As a result, the main control unit 38 of the controller 30 makes the display unit 34 to display the currently selected mode as well as a screen that inquires whether to change the mode or not.

Figure 14:
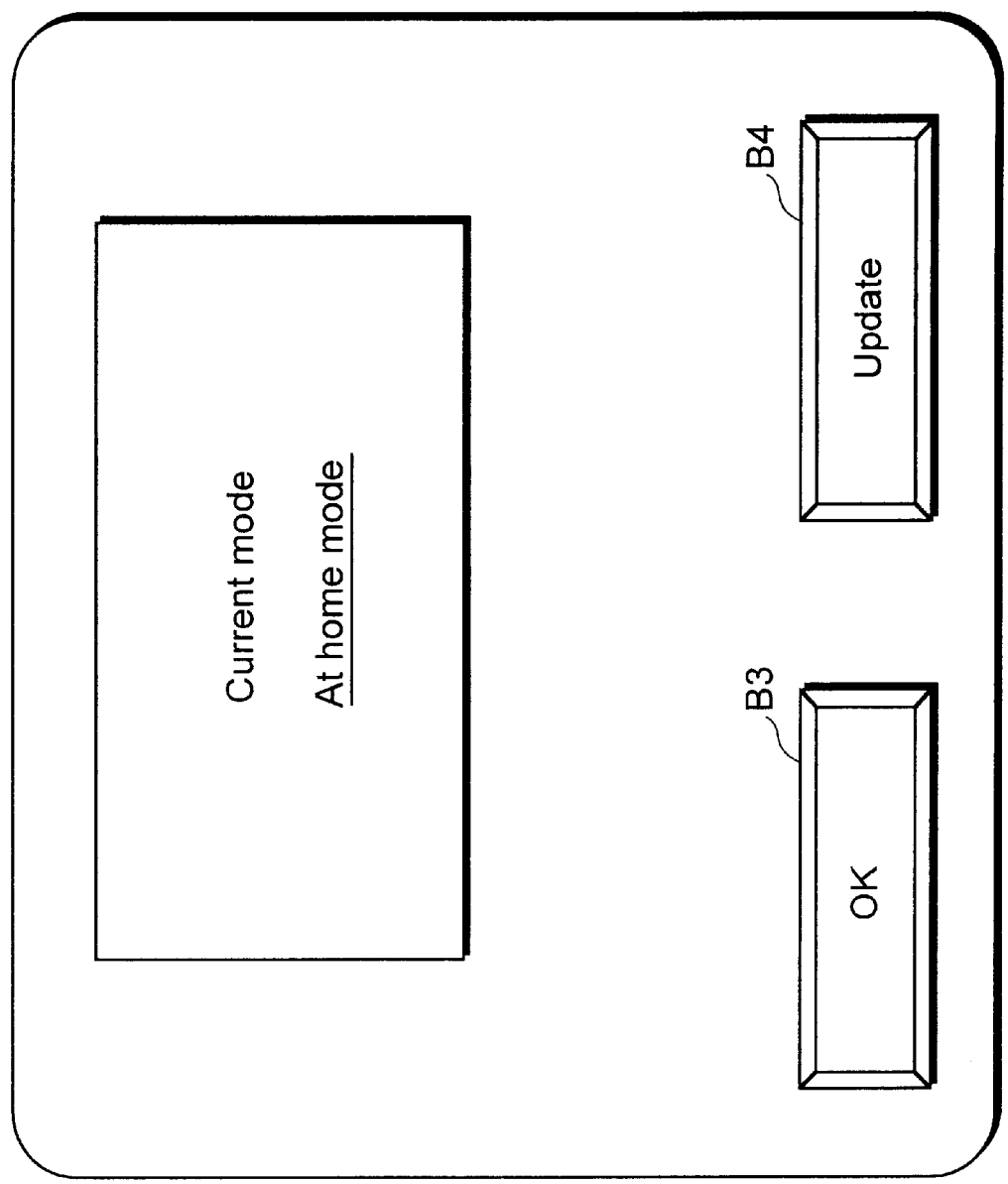
FIG. 14 is another screen display diagram of a controller according to the present embodiment.

FIG. 14 is a screen display diagram that shows an example of a screen of the display unit 34 for displaying the mode currently selected by the controller 30.

As shown in FIG. 14, for example, "At home mode" is displayed on the display unit 34 as a currently selected mode. Also on the display unit 34 are a button B3 which reads "OK" for directing that the current setting is not changed, and a button B4 which reads "Update" for directing to update the current setting.

In this way, the user is able to confirm the currently selected mode by viewing the screen displayed as mentioned above, and be able to recognize that the monitoring level is set to be the lowest when "At home mode" is displayed as explained above.

If the user desires to change the mode setting, the user operates the operation buttons of the operation unit 39 as has been explained, makes the button B4 highlighted and selects it.

As a result, the main control unit 38 of the controller 30 makes the display unit 34 to display a screen for selecting mode.

Figure 15:
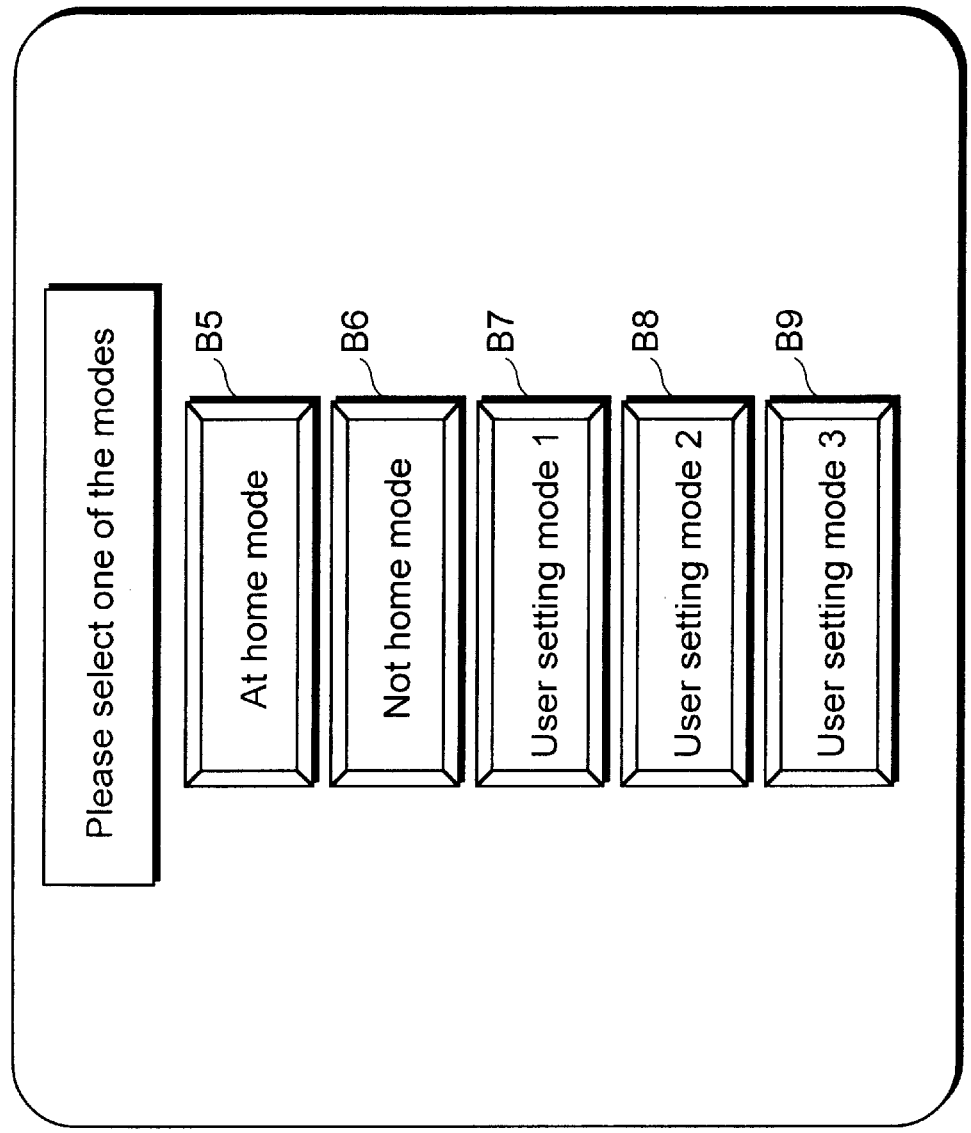
FIG. 15 is yet another screen display of a controller according to the present embodiment

FIG. 15 is a screen display diagram that shows an example of the above-mentioned selection screen.

As shown in FIG. 15, a plurality of buttons which indicate modes that can be selected are displayed on the display unit 34, which are: a button B5 that reads "At home mode", a button B6 that reads "Not home mode", a button B7 that reads "User setting mode 1", a button B8 that reads "User setting mode 2" and a button B9 that reads "User setting mode 3".

The user then operates the operation buttons of the operation unit 39 as has been explained, makes, for example, the button B7 that reads "User setting mode 1" highlighted and selects it.

As a result, the "User setting mode 1" is selected for the main control unit 38 of the controller 30, and when any of the sensors 11 to 18 detects human being, the main control unit 38 directs the cameras 21 to 26 that are linked with these sensors by the "User setting mode 1" to capture images.

In this way, the user is able to change as well as increase or decrease the locations of capturing images according to the level and condition of monitoring by operating the operation unit 39 of the controller 30.

Next, how the user can change the linkage setting in each of the "User setting mode 1", "User setting mode 2" and "User setting mode 3" is explained.

For example, if the user desires to change the linkage setting of the "User setting mode 1", which is the currently selected mode in this case, the user selects the button B2 which reads "Linkage setting" in the screen shown in FIG. 13.

As a result, the main control unit 38 of the controller 30 makes the display unit 34 to display a screen that allows to change the linkage setting.

Figure 16:
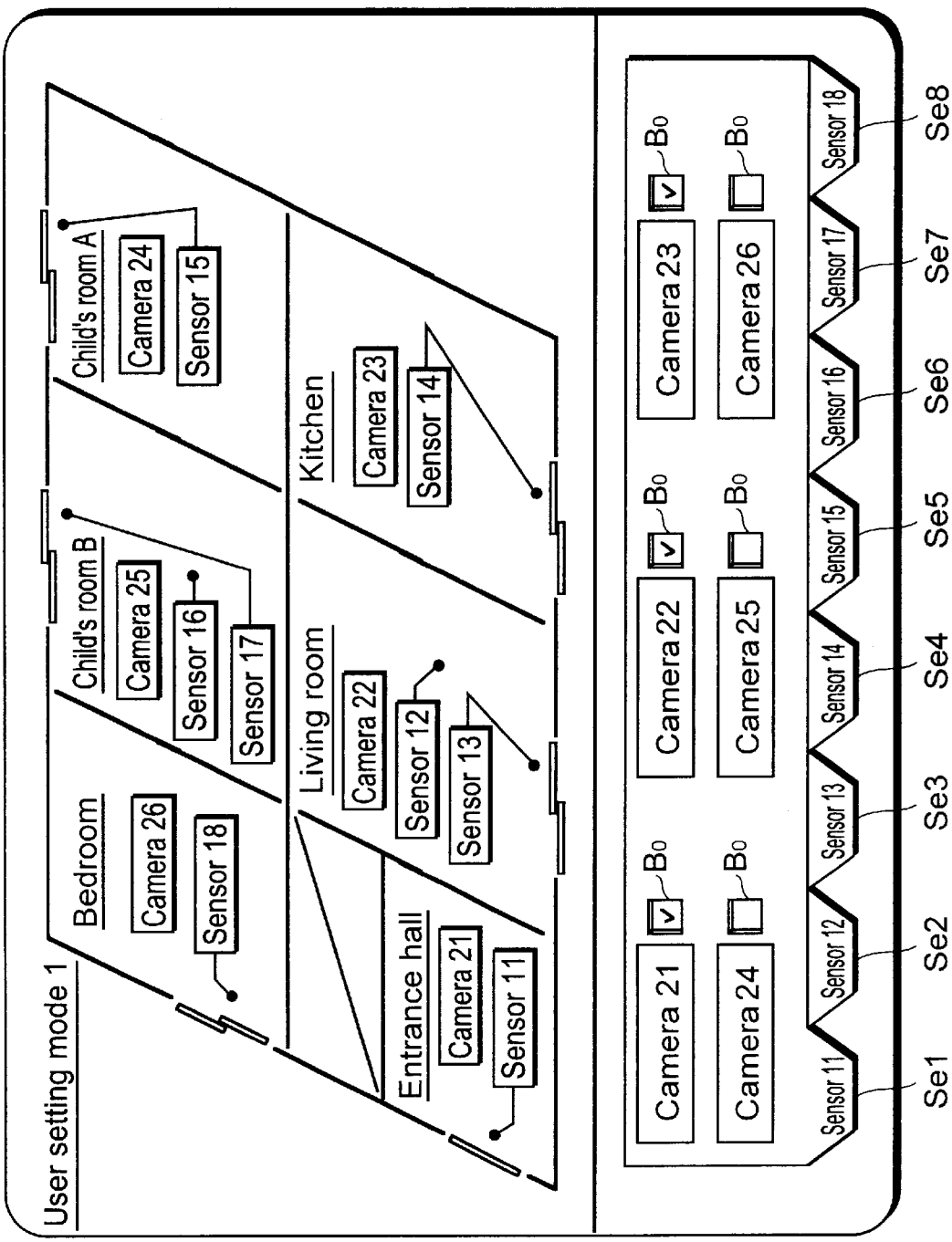
FIG. 16 is still another screen display diagram of a controller according to the present embodiment.

FIG. 16 is a screen display diagram that shows an example of a screen that allows to change linkage settings.

As shown in FIG. 16, the upper part of the display unit 34 displays the layout of the sensors 11 to 18 and cameras 21 to 26 to show their locations, and the bottom part of the display unit 34 displays a chart for selecting cameras that are associated with each of the sensors 11 to 18.

The chart consists of eight sheets Se1 to Se8 that correspond to each of the sensors, and in each of the sheets Se1 to Se8, cameras that are linked with each of the sensors are indicated. For example, the sheet Se1 shows the cameras that are linked with the sensor 11, and the sheet Se2 shows the cameras that are linked with the sensor 12.

To be specific, in the sheets Se1 to Se8, the names of cameras 21 to 26 are shown, and on the right of each camera names, check boxes Bo for showing check marks that indicate whether each camera is associated with the sensor or not are displayed. For example, if the check box Bo next to the name "Camera 21" has a check mark in it, the sheet Se1 indicates that the sensor 11 is linked with the camera 21.

In this way, the user is able to confirm the linkage setting in the "User setting mode 1".

If the user desires to change the linkage setting, the user selects the sheet that indicates the sensor subject to changing by operating the operation unit 39 of the controller 30, while referring to the layout displayed on the upper part of the display unit 34 at the same time. Then the user can add a check mark to the check box Bo next to the camera that is to be newly linked with the sensor, or delete the check mark in the check box Bo next to the camera that is to be removed from the linkage. In this way, the user can direct the controller 30 to change the linkage settings.

These directions given by the user is transmitted from the operation unit 39 of the controller 30 to the main control unit 38 as an operation signal, and the main control unit 38 updates the content of the linkage information 36d that is memorized in the linkage memory unit 36 according to the given direction.

Accordingly, in the present embodiment, the association between the sensors and cameras can be changed according to the user's choice by operating the controller 30.

Now, variations of the home security system according to the present embodiment are explained.

First, a variation relating to the camera is explained.

Figure 17:
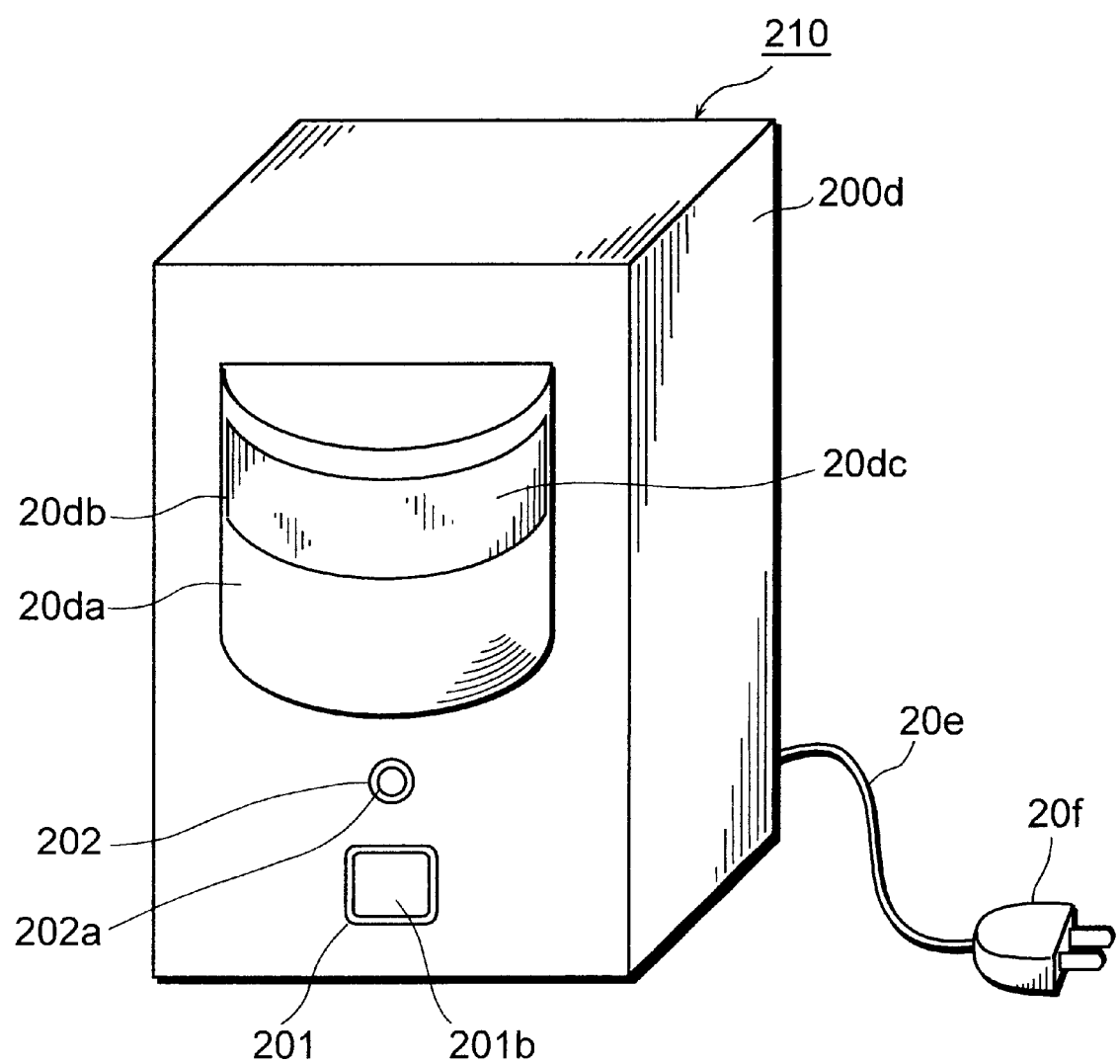
FIG. 17 is a perspective illustration of another camera according to the present embodiment.

FIG. 17 is a perspective illustration of a camera according to the variation.

The camera 210 shown in FIG. 17 has the basic structure and function of the cameras 21 to 26, and also is able to make the controller 30 to change the mode settings categorized according to the level and condition of monitoring by operating a push-button switch 201b that is located at the front side of the camera. This variation of the home security system includes the camera 210 instead of any or all of the cameras 21 to 26 used in the home security system according to the already mentioned embodiment.

Figure 18:
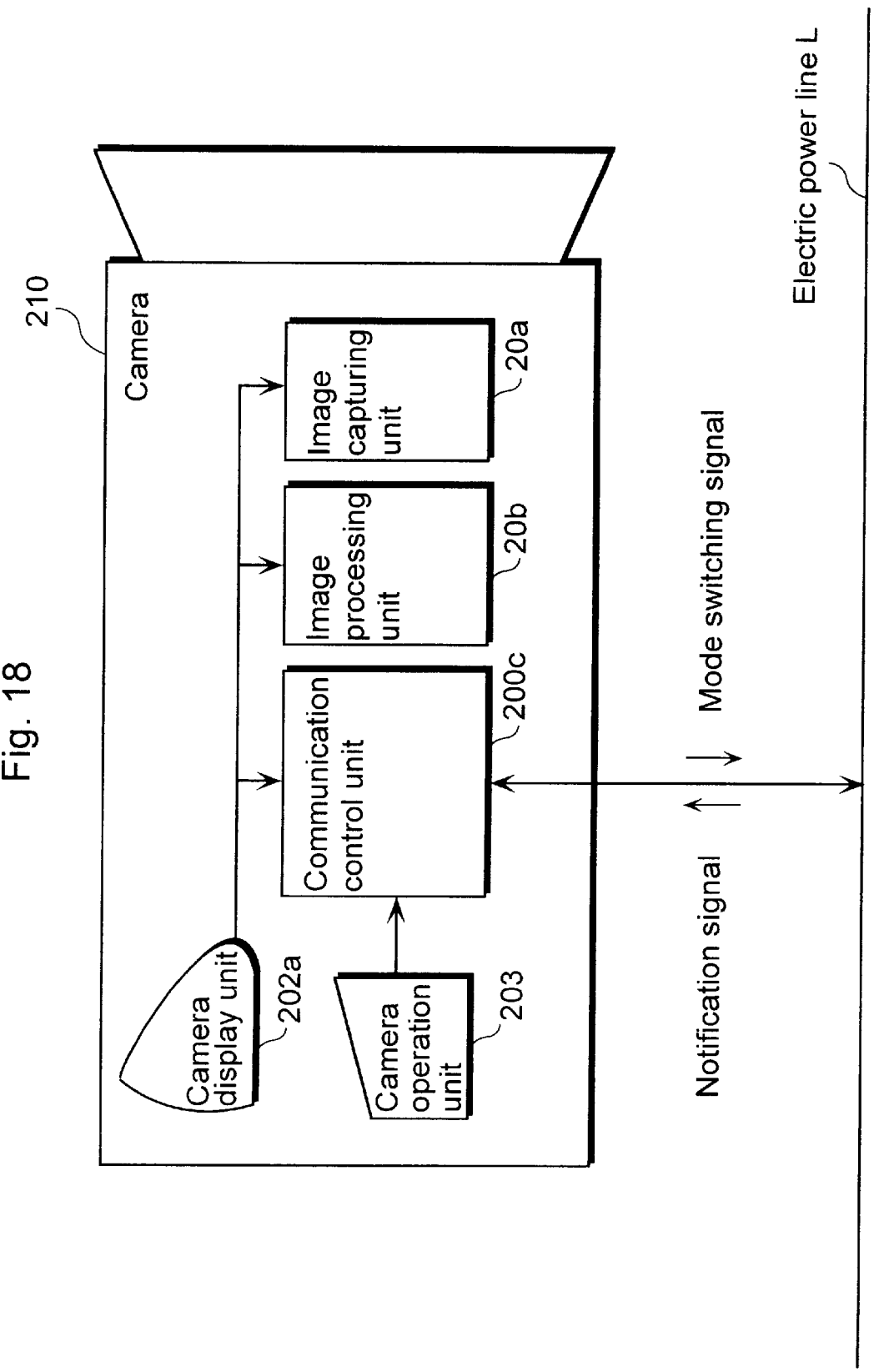
FIG. 18 is a block diagram showing an internal structure of the camera shown in FIG. 17 according to the present embodiment.

FIG. 18 is a block diagram showing an internal structure of the camera 210.

The camera 210 includes an image capturing unit 20a, an image processing unit 20b, a communication control unit 200c, a camera operation unit 203 equipped with the push-button switch 201b, and a camera display unit 202a that comprises, for example, light emitting diode.

The case 200d of the camera 210 is, as shown in FIG. 17 and similar to the case 20d of the cameras 21 to 26, shaped as a nearly rectangular box. At the front side of the case 200d are a protruding part 20da and an opening part 20db, and a window 202 for exposing the camera display unit 202a as well as an expose window 201 for exposing the push-button switch 201b are also formed.

The camera operation unit 203 outputs a signal according to the operation of the push-button switch 201b to the communication control unit 200c, and every time the communication control unit 200c receives the signal, it outputs a mode switching signal that directs to switch the mode to the controller 30 via the electric power lines L.

The main control unit 38 of the controller 30 obtains the mode switching signal via the electric power line communication unit 31, and switches the modes that are set in the order of "Not home mode"→"At home mode"→"User setting mode 1"→"User setting mode 2"→"User setting mode 3". This means, when the currently selected mode is the "Not home mode", the main control unit 38 changes the mode to "At home mode" by receiving a mode switching signal, and if it receives another mode switching signal, the main control unit 38 changes the mode to "User setting mode 1".

Then, the main control unit 38 makes the electric power line communication unit 31 to send, via the electric power lines L, a notification signal that notifies all of cameras 210 that are connected with the electric power lines L of the changed mode.

When the communication control unit 200c of the camera 210 obtains a notification signal from the controller 30, it specifies the changed mode based on the notification signal and makes the camera display unit 202a to light up according the changed mode.

For instance, if, based on a notification signal, it was judged that the mode setting was changed to "At home mode", the communication control unit 200c makes the camera display unit 202a to light up. Meanwhile, if it was judged that the mode setting was changed to "User setting mode 1", the camera display unit 202a is made to blink in a long cycle, or if it was judged that the mode setting was changed to "User setting mode 2", then the camera display unit 202a is made to blink in a short cycle. If the camera display unit 202a is able to emit multiple colors, the camera display unit 202a may also be made to emit different colors of light according to the changed modes.

Accordingly, in this variation, the user can easily change the mode setting, not by operating the controller 30 that is installed in the house, but by operating the push-button switch 201b of the camera operation unit 203 in the camera 210 that is near the user. The user can also figure out the currently selected mode quite easily by viewing the camera display unit 202a.

Next, a variation related to the sensor is explained.

Figure 19:
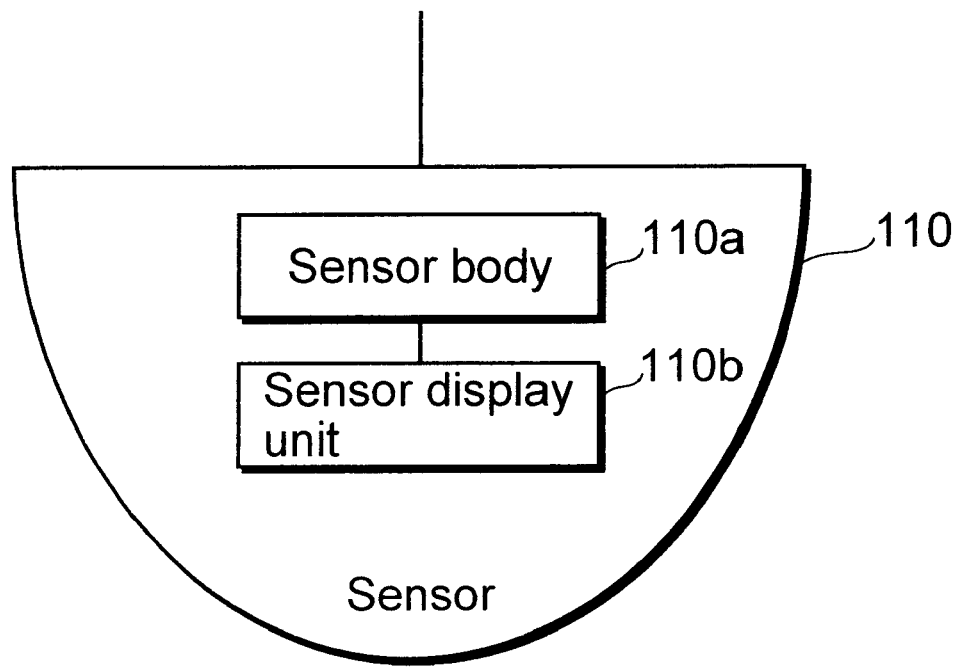
FIG. 19 is a block diagram showing an internal structure of another sensor.

FIG. 19 is a block diagram of a sensor according to the variation.

The sensor 110 shown in FIG. 19 has the basic structure and function of the sensors 11 to 18, and also is a sensor that displays the currently selected mode. This variation of the home security system includes the sensor 110 instead of any or all of the sensors 11 to 18 used in the home security system according to the already mentioned embodiment.

The sensor 110 includes a sensor body 110a that has similar functions as the sensors 11 to 18 and detects the existence of human being, as well as a sensor display unit 110b that comprises, for example, light emitting diode, that emits light according to the control from the sensor body 110a.

The main control unit 38 of the controller 30 in this variation outputs a notification signal that notifies all of sensors 110 of the changed mode setting every time it changes the mode setting that are categorized according to the level and condition of monitoring. When the sensor body 110a of the sensor 110 obtains the notification signal from the controller 30, it makes the sensor display unit 110b to light up according to the changed mode. This means, similar to the camera 210, the sensor display unit 110b displays the currently selected mode by blinking etc.

Accordingly, in this variation, the user can easily figure out the currently selected mode and the level and condition of monitoring, not by operating the controller 30 that is installed in the house, but by viewing the sensor display unit 110b of the sensor 110 that is near the user.

It is also possible to install the camera 210 instead of any or all of the cameras 21 to 26, and install the sensor 110 instead of any or all of the sensors 11 to 18.

In that case, the main control unit 38 of the controller 30 sends a notification signal that notifies all of cameras 210 and sensors 110 of the changed mode setting every time it changes the mode setting.

Accordingly, the user can easily change the mode setting, not by operating the controller 30 that is installed in the house, but by operating the camera operation unit 203 of the camera 210 that is near the user. The user can also figure out the currently selected mode more easily by viewing the camera display unit 202a or the sensor display unit 110b.

So far, the home security system according to the present invention has been explained using an embodiment as well as its variations, but the present invention is not limited to these explanations.

For example, in the present embodiment and its variations, the cellular phone 50 was used only to display the images that are placed on the web page by the center server 40, but the cellular phone 50 may also be used to display and change mode settings and linkage settings.

In this case, the center server 40 communicates with the controller 30 and makes the screens for mode setting and linkage setting as shown in FIGS. 13 to 16 to be placed on the web page. Then, the cellular phone 50 displays said web page onto its own display unit by accessing the center server 40.

Accordingly, the user can easily confirm the mode setting and the linkage setting from a place where he/she has gone by using the cellular phone 50.

Here, the cellular phone 50 carries out the operation similar to the operation unit 39 of the controller 30 according to the operation made with its own dial buttons, and sends, to the center server 40 via the Internet 100, an operation signal that selects the buttons B1 to B9 etc. on the screen as shown in FIGS. 13 to 16 that are displayed on the web page. Then, the center server 40 sends the operation signal from the cellular phone 50 to the controller 30, and makes the main control unit 38 of the controller 30 to change the mode settings and linkage settings.

In this way, the user can easily change the mode settings as well as linkage settings by using the cellular phone 50 from a place where he/she has gone.

It is also possible to have cameras 21 to 26 and 210 to include memory units that memorize image data P1.

In this case, the communication control unit 20c or 200c of the cameras 21 to 26 or 210 makes the information which indicates the date and time that the image data P1 is generated to be included in the image data P1, and then makes the memory unit to memorize the image data P1. When the main control unit 38 of the controller 30 receives, from the operation unit 39, an operation signal that specifies a date and time and directs to display the images captured on the date and time, the main control unit 38 makes the image requesting unit 31c of the electric power light communication unit 31 to request, to the cameras 21 to 26 and 210, to send the image data P1 which includes the information that indicates the specified date and time. As a result, the communication control unit 20c or 200c of the cameras 21 to 26 or 210 selects, from the memory unit, image data P1 that corresponds to the request from the controller 30 and sends the image data P1 to the controller 30.

In this way, the usability of the home security system can be improved.

Additionally, the cameras 21 to 26 and 210, the sensors 11 to 18 and 110, and the controller 30 transmit signals between each other via electric power lines L in the present embodiment and its variations, but the transmission can also be made, other than the electric power lines L, via dedicated communication cables etc.

Furthermore, the currently selected mode and the relationships between sensors and cameras that are set according to each mode are displayed by the display unit 34 only by operating the operation unit 39 of the controller 30 in the present embodiment and its variations, but it can also be made to display the information all the time regardless of the operation of the operation unit 39. In such case, the user can easily confirm the current settings without operating the operation unit 39.

What is claimed is:

1. A home security system that monitors an inside of a facility comprising:
    a plurality of detection units operable to detect an alarming situation in different locations inside the facility;
    a plurality of image capturing units operable to capture an image in different locations inside the facility;
    an association memory unit operable to memorize associations between a plurality of the detection units and a plurality of the image capturing units;
    an updating unit operable to update the associations memorized in the association memory unit; and
    a control unit operable to, when one of a plurality of the detection units detects an alarming situation, have the image capturing unit which is associated with the detection unit that detects the alarming situation capture an image based on the associations memorized in the association memory unit.

2. The home security system according to claim 1, wherein a plurality of the detection units, a plurality of the image capturing units and the control unit communicate each other via an electric power line.

3. The home security system according to claim 2 further comprising an image display unit,
    wherein the image capturing unit sends image data that indicates content of the captured image to the image display unit, and
    the image display unit displays the image captured by the image capturing unit based on the image data.

4. The home security system according to claim 3, wherein the association memory unit memorizes a plural sets of the associations,
    the updating unit selects one of the plural sets of the associations, and
    the control unit has the image capturing unit which is associated with the detection unit that detects an alarming situation capture an image based on the selected set of associations.

5. The home security system according to claim 4 further comprising a server that communicates with the image display unit and provides an image via a communication line,
    wherein the image display unit sends the image data obtained from the image capturing unit to the server, and
    the server provides the image based on the image data to a device that accesses the server via the communication line.

6. The home security system according to claim 5 further comprising a cellular phone that obtains the image data from the server by accessing the server via the communication line and displays the image based on the image data.

7. The home security system according to claim 6,
    wherein the server communicates with the updating unit via the communication line, and
    the cellular phone specifies one of the plural sets of the associations and directs the updating unit via the server to select the specified set of the associations.

8. The home security system according to claim 6,
    wherein the cellular phone directs the updating unit via the server to update an association in a set of the associations.

9. The home security system according to claim 5,
    wherein the server communicates with the updating unit via the communication line and notifies a device that accesses the server via the communication line of the set of the associations selected by the updating unit.

10. The home security system according to claim 4,
    wherein the updating unit updates an association in a set of the associations.

11. The home security system according to claim 4,
    wherein the updating unit notifies a plurality of the detection units of the set of the associations currently selected, and
    the detection unit includes an informing device that informs the set of the associations based on the notification.

12. The home security system according to claim 4,
    wherein the updating unit notifies a plurality of the image capturing units of the set of the associations currently selected, and
    the image capturing unit includes an informing device that informs the set of the associations based on the notification.

13. The home security system according to claim 4,
    wherein the image capturing unit specifies one of the plural sets of the associations and directs the updating unit to select the specified set of the associations.

14. The home security system according to claim 3,
    wherein the image capturing unit compresses the image data before sending the image data to the image display unit.

15. The home security system according to claim 14,
    wherein the image capturing unit notifies the image display unit of a data size of the image data, and
    the image display unit judges whether it is necessary to compress the image data or not based on the notification, and when the image display unit judges that compressing is necessary, calculates necessary compression ratio and directs the image capturing unit to compress the image data in the compression ratio.

16. The home security system according to claim 3, wherein the image capturing unit divides the image data before sending.

17. The home security system according to claim 16, wherein when the image capturing unit sends each of the divided image data separately, the image capturing unit sends the image data which includes identification information that indicates a number for identifying each of the divided image data.

18. The home security system according to claim 1, wherein the image capturing unit captures an image of a scene viewed within a range of approximately 180 degree angle in a horizontal direction.

19. The home security system according to claim 1, wherein the detection unit is equipped with a human body detection sensor that detects a human body.

20. The home security system according to claim 1, wherein the updating unit updates an association memorized in the association memory unit based on an interaction with a user.

21. A monitoring method in a home security system for monitoring an inside of a facility including a plurality of detection units operable to detect an alarming situation in different locations inside the facility and a plurality of image capturing units operable to capture an image in different locations inside the facility, the monitoring method comprising:

a memorizing step for memorizing in advance associations between a plurality of the detection units and a plurality of the image capturing units in a memory unit;

an updating step for updating the associations memorized in the memory unit; and an image capturing step for, when one of a plurality of the detection units detects an alarming situation, having the image capturing unit which is associated with the detection unit that detects the alarming situation capture an image based on the associations memorized in the memory unit.

22. The monitoring method according to claim 21, wherein the home security system includes a control unit operable to perform the image capturing step, and a plurality of the detection units, a plurality of the image capturing units and the control unit communicate each other via an electric power line.

23. The monitoring method according to claim 22 further comprising:

an image transmission step for sending image data that indicates content of the captured image from the image capturing unit to an image display unit; and a displaying step for the image display unit to display the image captured in the image capturing step based on the image data.

24. The monitoring method according to claim 23, wherein in the memorizing step, a plural sets of the associations are memorized in the memory unit, in the updating step, one of the plural sets of the associations is selected, and in the image capturing step, the image capturing unit which is associated with the detection unit that detects an alarming situation captures an image based on the selected set of associations.

25. The monitoring method according to claim 24 further comprising:

a server transmission step for the image display unit to send the image data obtained in the image transmission step to a server; and an image provision step for the server to provide the image based on the image data to a device that accesses the server via a communication line.

26. The monitoring method according to claim 25 further comprising:

an access step for a cellular phone to access the server via the communication line;

an image data obtaining step for the cellular phone to obtain the image data from the server; and an image display step for the cellular phone to display the image based on the image data.

27. The monitoring method according to claim 26 further comprising a selection direction step for the cellular phone to specify one of the plural sets of the associations and to have the specified set of the associations be selected in the updating step.

28. The monitoring method according to claim 24, wherein in the updating step, an association is updated in a set of the associations.

29. The monitoring method according to claim 23 further comprising a compression step for the image capturing unit to compress the image data before sending the image data to the image display unit.

30. The monitoring method according to claim 29 further comprising:

a size notification step for the image capturing unit to notify the image display unit of a data size of the image data;

a judging step for the image display unit to judge whether it is necessary to compress the image data or not based on the notification;

a calculation step for the image display unit to calculate necessary compression ratio when the image display unit judges that compressing is necessary in the judging step; and a compression direction step for the image display unit to direct the image capturing unit to compress the image data in the compression ratio.

31. The monitoring method according to claim 23 further comprising a dividing and transmitting step for the image capturing unit to divide the image data before sending.

32. A program for a home security system for monitoring an inside of a facility including a plurality of detection units operable to detect an alarming situation in different locations inside the facility and a plurality of image capturing units operable to capture an image in different locations inside the facility, the program comprising:

a memorizing step for memorizing in advance associations between a plurality of the detection units and a plurality of the image capturing units in a memory unit;

an updating step for updating the associations memorized in the memory unit; and an image capturing step for, when one of a plurality of the detection units detects an alarming situation, having the image capturing unit which is associated with the detection unit that detects the alarming situation capture an image based on the associations memorized in the memory unit.

33. The program according to claim 32, wherein the home security system includes a control unit operable to perform the image capturing step, and a plurality of the detection units, a plurality of the image capturing units and the control unit communicate each other via an electric power line.-

34. The program according to claim 33 further comprising:
- an image transmission step for sending image data that indicates content of the captured image from the image capturing unit to an image display unit; and
- a displaying step for the image display unit to display the image captured in the image capturing step based on the image data.

35. The program according to claim 34,
wherein in the memorizing step, a plural sets of the associations are memorized in the memory unit,
in the updating step, one of the plural sets of the associations is selected, and
in the image capturing step, the image capturing unit which is associated with the detection unit that detects an alarming situation captures an image based on the selected set of associations.

36. The program according to claim 35 further comprising:
- a server transmission step for the image display unit to send the image data obtained in the image transmission step to a server; and
- an image provision step for the server to provide the image based on the image data to a device that accesses the server via a communication line.

37. The program according to claim 36 further comprising:
- an access step for a cellular phone to access the server via the communication line;
- an image data obtaining step for the cellular phone to obtain the image data from the server; and
- an image display step for the cellular phone to display the image based on the image data.

38. The program according to claim 37 further comprising a selection direction step for the cellular phone to specify one of the plural sets of the associations and to have the specified set of the associations be selected in the updating step.

39. The program according to claim 35,
wherein in the updating step, an association is updated in a set of the associations.

40. The program according to claim 34 further comprising a compression step for the image capturing unit to compress the image data before sending the image data to the image display unit.

41. The program according to claim 40 further comprising:
- a size notification step for the image capturing unit to notify the image display unit of a data size of the image data;
- a judging step for the image display unit to judge whether it is necessary to compress the image data or not based on the notification;
- a calculation step for the image display unit to calculate necessary compression ratio when the image display unit judges that compressing is necessary in the judging step; and
- a compression direction step for the image display unit to direct the image capturing unit to compress the image data in the compression ratio.

42. The program according to claim 34 further comprising a dividing and transmitting step for the image capturing unit to divide the image data before sending.

* * * * *